(12) United States Patent
Cabre et al.

(10) Patent No.: US 12,028,443 B2
(45) Date of Patent: Jul. 2, 2024

(54) SECURITY PROFILES FOR INTERNET OF THINGS DEVICES AND TRUSTED PLATFORMS

(71) Applicant: Intel Corporation, Santa Clara, CA (US)

(72) Inventors: Eduardo Cabre, Chandler, AZ (US); Nathan Heldt-Sheller, Portland, OR (US); Ned M. Smith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 637 days.

(21) Appl. No.: 16/650,439

(22) PCT Filed: Sep. 28, 2018

(86) PCT No.: PCT/US2018/053433
§ 371 (c)(1),
(2) Date: Mar. 25, 2020

(87) PCT Pub. No.: WO2019/147311
PCT Pub. Date: Aug. 1, 2019

(65) Prior Publication Data
US 2022/0303123 A1    Sep. 22, 2022

Related U.S. Application Data

(60) Provisional application No. 62/621,376, filed on Jan. 24, 2018.

(51) Int. Cl.
*H04L 9/08* (2006.01)
*G06F 21/57* (2013.01)

(52) U.S. Cl.
CPC .......... *H04L 9/0825* (2013.01); *G06F 21/575* (2013.01); *H04L 9/0838* (2013.01); *H04L 9/0866* (2013.01)

(58) Field of Classification Search
CPC ................. H04L 9/0825; H04L 9/0838; H04L 9/0866; G06F 21/575
See application file for complete search history.

(56) References Cited

U.S. PATENT DOCUMENTS

2007/0143629 A1 *  6/2007  Hardjono ............ H04L 63/0823
                                                            713/181
2014/0075506 A1 *  3/2014  Davis ................. H04B 7/18508
                                                            726/3

(Continued)

FOREIGN PATENT DOCUMENTS

CA         2766357 A1 *  7/2012  ........... G06F 1/1626
WO    WO-2013174437 A1    11/2013
WO    WO-2019147311 A1     8/2019

OTHER PUBLICATIONS

"Anonymous, OCF Security Specification V1.0.0, pp. 104" (Year: 2017).*

(Continued)

*Primary Examiner* — Jeffrey C Pwu
*Assistant Examiner* — Mayasa A. Shaawat
(74) *Attorney, Agent, or Firm* — Schwegman Lundberg & Woessner, P.A.

(57) ABSTRACT

Various systems and methods for establishing security profiles for Internet of Things (IoT) devices and trusted platforms, including in OCF specification device deployments, are discussed herein. In an example, a technique for onboarding a subject device for use with a security profile, includes: receiving a request to perform an owner transfer method of a device associated with a device platform; verifying attestation evidence associated with the subject device, the attestation evidence being signed by a certificate produced using a manufacturer-embedded key, with the key provided from a trusted hardware component of the device platform; and performing device provisioning of the subject (Continued)

device, based on the attestation evidence, as the device provisioning causes the subject device to use a security profile tied to manufacturer-embedded keys.

25 Claims, 11 Drawing Sheets

(56) References Cited

U.S. PATENT DOCUMENTS

2016/0080379 A1* 3/2016 Saboori ............ H04W 12/0431
                                                                726/5
2017/0364908 A1* 12/2017 Smith ................. G06Q 20/023

OTHER PUBLICATIONS

"International Application Serial No. PCT/US2018/053433, International Search Report dated Nov. 30, 2018", 5 pgs.
"International Application Serial No. PCT/US2018/053433, Written Opinion dated Nov. 30, 2018", 7 pgs.
"OCF Security Specification V1.0.0", Open Connectivity Foundation (OCF), [Online] Retrieved from the internet: <https://openconnectivity.org/draftspecs/OCF_Securi ty_Speci fi cati on_vl.0.0.pdf>, (Mar. 22, 2017), 104 pgs.

* cited by examiner

SECURITY PROFILES FOR INTERNET OF THINGS DEVICES AND TRUSTED PLATFORMS

PRIORITY CLAIM

This application is a U.S. National Stage Application under 35 U.S.C. 371 from International Application No. PCT/US2018/053433, filed Sep. 28, 2018, published as WO 2019/147311, which claims the benefit of priority to U.S. Provisional Patent Application Ser. No. 62/621,376, filed Jan. 24, 2018 and titled "SECURITY PROFILES FOR OCF DEVICES AND TRUSTED PLATFORMS", all of which are incorporated herein by reference in their entirety.

TECHNICAL FIELD

Embodiments described herein generally relate to data communications and interconnected device networks, and in particular, to techniques for establishing connections and implementing functionality among internet of things (IoT) devices and device networks.

BACKGROUND

IoT devices are physical or virtualized objects that may communicate on a network, and may include sensors, actuators, and other input/output components, such as to collect data or perform actions from a real world environment. For example, IoT devices may include low-powered devices that are embedded or attached to everyday things, such as buildings, vehicles, packages, etc., to provide an additional level of artificial sensory perception of those things. Recently. IoT devices have become more popular and thus applications using these devices have proliferated.

Various standards have been proposed to more effectively interconnect and operate IoT devices and IoT network use cases. These include the specialization of communication standards distributed by groups such as Institute of Electrical and Electronics Engineers (IEEE), and the specialization of application interaction architecture and configuration standards distributed by groups such as the Open Connectivity Foundation (OCF).

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
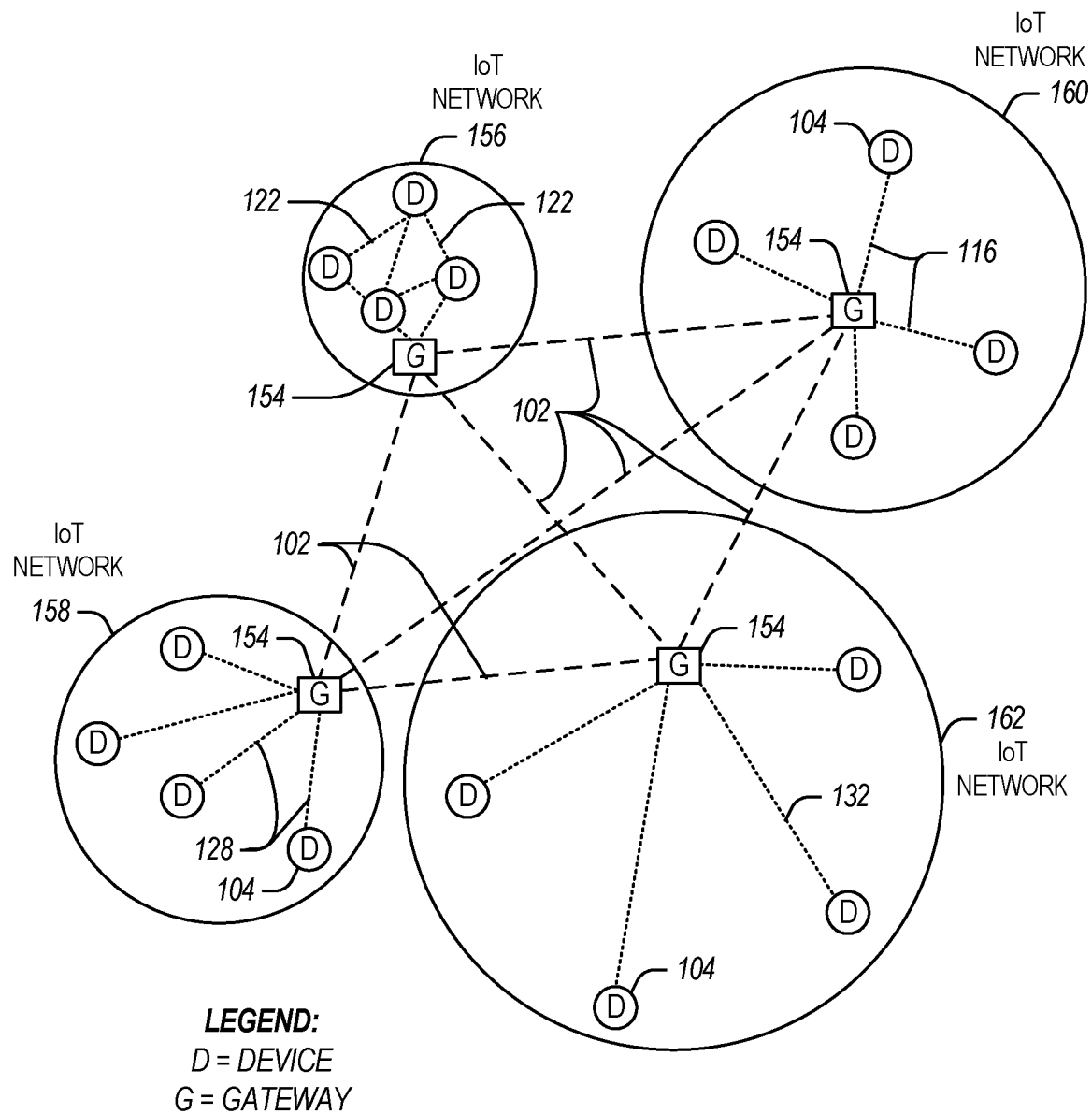
FIG. 1 illustrates a domain topology for respective internet-of-things (IoT) networks coupled through links to respective gateways, according to an example.

In the following description, methods, configurations, and related apparatuses are disclosed for the use of a trusted platform to support security profiles among respective IoT devices. In an example, applicable to an OCF device configuration that involves public key infrastructure (PKI) components, such a platform may enable deployment of OCF devices and services that utilize certificates generated by a common root certificate authority (CA) (e.g., a CA owned or operated by OCF or another trusted organization), while ensuring validity of the certificates through the use of a security profile and associated attestation.

The use and configuration of a trusted platform, as discussed herein, may involve aspects of Trusted Computing Group (TCG) technology and the incorporation of TCG features into an OCF or similar IoT network deployment. The following techniques enable an OCF device to be bound to TCG-compliant platform, such as by using TCG platform certificates to link to OCF trust assertions. Further, the use of this trusted platform may enable trust to be established directly among respective OCF devices, and compliance testing with published electronic results.

The following techniques may be used, for example, to enable a standards or overseeing organization to sign a document capturing the status of conformance tests. The organization then may identify which trust anchor that the organization is using and communicate this information to relevant onboarding tools (OBTs) and services.

The following techniques also enable an organization to publish which CA that the organization has selected through use of a public blockchain. OBTs used by the network deployment may query the blockchain to reliably find the most current published trust anchor. If any of the keys found in the CA hierarchy between the organization and their chosen root have been compromised, a reputable organization may publish a trust anchor revocation message to the blockchain, thereby invalidating the previously committed block containing the trust anchor.

Additionally, further extensions of the present techniques may utilize TCG specifications for Public Key Infrastructure (PKI) certificates, to link platform trust assertions to the device quality assertions maintained by the organization (e.g., by the OCF organization). These and other technical benefits may be achieved within OCF and like IoT network deployments.

In an example, the present techniques and configurations may integrate aspects of traditional and highly constrained trusted environments, to support storage of a trust anchor policy where access to the storage is conditional upon execution of a certificate path validation code or logic having been securely launched in a trusted environment. Such trusted environments include, but are not limited to, TCG Trusted Platform Module (TPM), Intel Secure Guard Extensions (SGX), Intel Management Engine (ME), Intel Virtualization Technology (VT-X), Intel Trusted Execution Technology (TXT), Intel Memory Controller, Intel 3D CrosssPoint or Optane Memory, Intel Memory Encryption Technology, Intel SMI Transfer Monitor (STM), ARM TrustZone or other hardware security modules.

Also in an example, the present techniques and configurations may enable use of a network onboarding tool (such as is defined by the OCF specification), to utilize a trust environment mechanism for securing trust anchor policies.

Also in an example, the present techniques and configurations may enable a highly constrained platform to perform network onboarding duties on behalf of a network owner.

Also in an example, the present techniques and configurations may enable a mesh of trusted environments (containing certificate path validation code/logic) and secure memory (containing a trust anchor policy) to be provisioned consistently. The present techniques and configurations may also provide the effect of allowing every mesh platform to apply the same trust anchor policy.

Also in an example, the present techniques and configurations enable any network node having a trust anchor policy to onboard other non-member nodes, using the trust anchor policy along with other policies that define network onboarding and network expansion criteria. These and other technical benefits, usable in a variety of IoT network deployments, will be apparent from the following discussion.

FIG. 1 illustrates an example domain topology for respective IoT networks coupled through links to respective gateways. The IoT supports deployments in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 2:
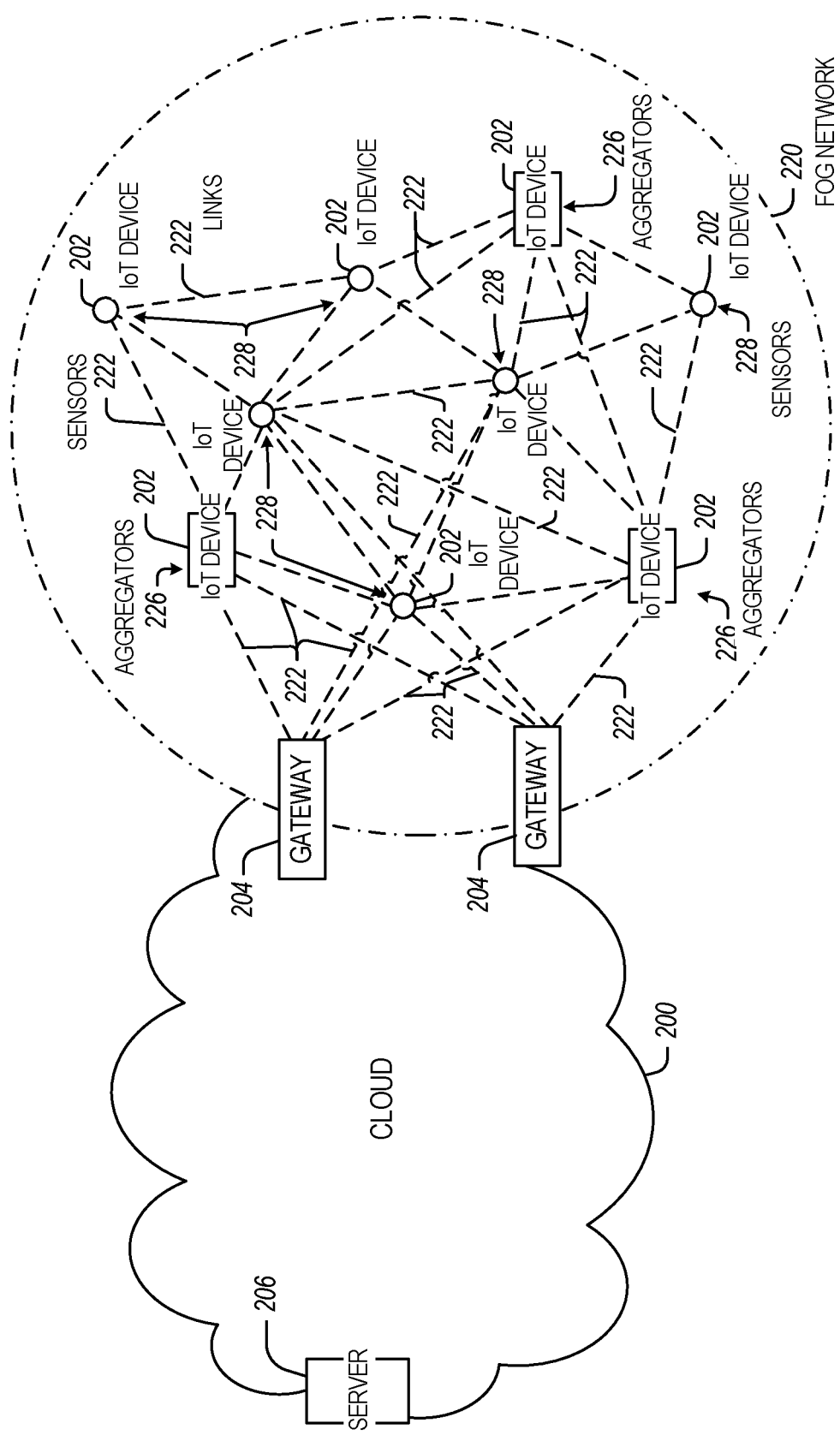
FIG. 2 illustrates a cloud computing network in communication with a mesh network of IoT devices operating as a fog device at the edge of the cloud computing network, according to an example.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 1 and 2, present a number of new challenges in a heterogeneous network of connectivity comprising a combination of wired and wireless technologies.

FIG. 1 specifically provides a simplified drawing of a domain topology that may be used for a number of IoT networks comprising IoT devices 104, with the IoT networks 156, 158, 160, 162, coupled through backbone links 102 to respective gateways 154. For example, a number of IoT devices 104 may communicate with a gateway 154, and with each other through the gateway 154. To simplify the drawing, not every IoT device 104, or communications link (e.g., link 116, 122, 128, or 132) is labeled. The backbone links 102 may include any number of wired or wireless technologies, including optical networks, and may be part of a local area network (LAN), a wide area network (WAN), or the Internet. Additionally, such communication links facilitate optical signal paths among both IoT devices 104 and gateways 154, including the use of MUXing/deMUXing components that facilitate interconnection of the various devices.

The network topology may include any number of types of IoT networks, such as a mesh network provided with the network 156 using Bluetooth low energy (BLE) links 122. Other types of IoT networks that may be present include a wireless local area network (WLAN) network 158 used to communicate with IoT devices 104 through IEEE 802.11 (Wi-Fi®) links 128, a cellular network 160 used to communicate with IoT devices 104 through an LTE/LTE-A (4G) or 5G cellular network, and a low-power wide area (LPWA) network 162, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into "fog" devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 104, such as over the backbone links 102, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, or vibration, into the autonomous organizations among the IoT devices. The integration of sensory systems may allow systematic and autonomous communication and coordination of service delivery against contractual service objectives, orchestration and QoS-based swarming and fusion of resources. Individual examples of network-based resource processing include the following.

The mesh network 156, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 158, for instance, may use systems that perform standards conversion to provide multi-standard connectivity, enabling IoT devices 104 using different protocols to communicate. Further systems may provide seamless interconnectivity across a multi-standard infrastructure comprising visible Internet resources and hidden Internet resources.

Communications in the cellular network 160, for instance, may be enhanced by systems that offload data, extend communications to more remote devices, or both. The LPWA network 162 may include systems that perform non-Internet protocol (IP) to IP interconnections, addressing, and routing. Further, each of the IoT devices 104 may include the appropriate transceiver for wide area communications with that device. Further, each IoT device 104 may include other transceivers for communications using additional protocols and frequencies. This is discussed further with respect to the communication environment and hardware of an IoT processing device depicted in FIGS. 10 and 11.

In still further examples, aspects of network virtualization and virtualized/software-based functional management, including software defined networking (SDN), may be implemented with the networks 158, 160, 162, or other entities. For instance, SDN may provide a software-based programmable network that separates the control plane from the data plane to make the network and network functions more flexible, agile, scalable, and less dependent on networking equipment, vendors, and service providers. Other use cases of SDN features may involve dynamic network configurations, monitoring, and the abstraction of network functions in virtualized and dynamic systems, for redundancy, control, and improved performance.

Finally, clusters of IoT devices may be equipped to communicate with other IoT devices as well as with a cloud network. This may allow the IoT devices to form an ad-hoc network between the devices, allowing them to function as a single device, which may be termed a fog device, fog platform, or fog network. This configuration is discussed further with respect to FIG. 2 below.

FIG. 2 illustrates a cloud computing network in communication with a mesh network of IoT devices (devices 202) operating as a fog platform in a networked scenario. The mesh network of IoT devices may be termed a fog network 220, established from a network of devices operating at the edge of the cloud 200. To simplify the diagram, not every IoT device 202 is labeled.

The fog network 220 may be considered to be a massively interconnected network wherein a number of IoT devices 202 are in communications with each other, for example, by radio links 222. The fog network 220 may establish a horizontal, physical, or virtual resource platform that can be considered to reside between IoT edge devices and cloud or data centers. A fog network, in some examples, may support vertically-isolated, latency-sensitive applications through layered, federated, or distributed computing, storage, and network connectivity operations. However, a fog network may also be used to distribute resources and services at and among the edge and the cloud. Thus, references in the present document to the "edge", "fog", and "cloud" are not necessarily discrete or exclusive of one another.

As an example, the fog network 220 may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 202 are shown in this example, gateways 204, data aggregators 226, and sensors 228, although any combinations of IoT devices 202 and functionality may be used. The gateways 204 may be edge devices that provide communications between the cloud 200 and the fog network 220, and may also provide the backend process function for data obtained from sensors 228, such as motion data, flow data, temperature data, and the like. The data aggregators 226 may collect data from any number of the sensors 228, and perform the back end processing function for the analysis. The results, raw data, or both may be passed along to the cloud 200 through the gateways 204. The sensors 228 may be full IoT devices 202, for example, capable of both collecting data and processing the data. In some cases, the sensors 228 may be more limited in functionality, for example, collecting the data and allowing the data aggregators 226 or gateways 204 to process the data.

Communications from any IoT device 202 may be passed along a convenient path (e.g., a most convenient path) between any of the IoT devices 202 to reach the gateways 204. In these networks, the number of interconnections provide substantial redundancy, allowing communications to be maintained, even with the loss of a number of IoT devices 202. Further, the use of a mesh network may allow IoT devices 202 that are very low power or located at a distance from infrastructure to be used, as the range to connect to another IoT device 202 may be much less than the range to connect to the gateways 204.

The fog network 220 provided from these IoT devices 202 may be presented to devices in the cloud 200, such as a server 206, as a single device located at the edge of the cloud 200, e.g., a fog network operating as a device or platform. In this example, the alerts coming from the fog platform may be sent without being identified as coming from a specific IoT device 202 within the fog network 220. In this fashion, the fog network 220 may be considered a distributed platform that provides computing and storage resources to perform processing or data-intensive tasks such as data analytics, data aggregation, and machine-learning, among others.

In some examples, the IoT devices 202 may be configured using an imperative programming style, e.g., with each IoT device 202 having a specific function and communication partners. However, the IoT devices 202 forming the fog device may be configured in a declarative programming style, allowing the IoT devices 202 to reconfigure their operations and communications, such as to determine needed resources in response to conditions, queries, and device failures. As an example, a query from a user located at a server 206 about the operations of a subset of equipment monitored by the IoT devices 202 may result in the fog network 220 device selecting the IoT devices 202, such as particular sensors 228, needed to answer the query. The data from these sensors 228 may then be aggregated and analyzed by any combination of the sensors 228, data aggregators 226, or gateways 204, before being sent on by the fog network 220 device to the server 206 to answer the query. In this example, IoT devices 202 in the fog network 220 may select the sensors 228 used based on the query, such as adding data from flow sensors or temperature sensors. Further, if some of the IoT devices 202 are not operational, other IoT devices 202 in the fog network 220 may provide analogous data, if available.

In an OCF architecture, entities in the real physical world (e.g., a temperature sensor) are represented as resources. Interactions with entities are implemented through resource representations, which use operations that adhere to Representational State Transfer (REST) architectures. e.g., RESTful interactions. As such, entities are exposed as resources, each with their unique identifiers (URIs) and support interfaces that enable RESTful operations on their resources. A client initiates a RESTful operation on a server. The client is the initiator and the server is a responder. Any device may act as a client to initiate a RESTful operation or any other device acting as a server. Thus, the role of a device as a client or server, in many circumstances, may be interchangeable. Any device that exposes a resource is by definition, a server. Each RESTful operation contains all of the information needed to understand the context of the operation and is supported by a set of generic operations (e.g., CREATE, RETRIEVE, UPDATE, DELETE, and NOTIFY (CRUDN)).

As discussed herein, the following techniques may be implemented in connection with use of various OCF services, including DOTS (also known as DOXS, Device Owner Transfer Service). In a further example, the following techniques may be implemented in connection with an onboarding tool (OBT). In the context of an OCF implementation, an OBT is a logical entity within a specific IoT network that establishes ownership for a specific device and helps bring the device into operational state within that network. For instance, a typical OBT may implement DOXS, AMS (Access Management Service), and CMS (Credential Management Service) functionality.

In some implementations of the OCF specification, a Public Key Infrastructure (PKI) component may be utilized, that requires OCF devices and services to obtain a manufacturing certificate from a common root CA (e.g., a CA owned/operated by OCF or another trusted organization). Such a PKI approach may introduce undesirable security and operational issues for hardware suppliers. For example, it could result in the hardware vendor or manufacturer having to recall OCF-compliant products if the OCF root CA key is compromised. The following techniques and configurations are usable in the context of an OCF IoT deployment to provide security in the context of this PKI approach.

With the following techniques, in a scenario where OCF establishes a common OCF root CA infrastructure for security operation, vendors of OCF Devices may embed an OCF trust anchor in platforms they manufacture, and obtain manufacturer certs for embedded manufacturing keys. One of the goals of the OCF PKI approach is to include OCF compliance extensions in certificates. This may be used to ensure that signed compliance assertions cannot be easily faked; such compliance extensions also may be verified by onboarding tools, and may be standardized/interoperable. These goals may be maintained with use of the presently described platform configuration.

As used in the following discussion, an OCF device refers to a logical representation of OCF-defined functionality; a platform refers to an environment used to host OCF devices. Thus, although a "platform" may not be expressly or fully defined by current OCF specifications, the following use of a trusted platform and security profile offers the potential for additional security definition and verification.

Some of the security challenges with current and proposed PKI implementations of OCF devices (or like IoT device deployments) include:

a) OCF devices are software (not a trusted hardware platform). OCF compliance assertions do not specify the platform environment; and as a result, less trustworthy platforms may host the same OCF device software. As a security consequence, less trustworthy OCF devices appear equally trustworthy.

b) Multiple OCF devices may be hosted by the same platform. As a result, onboarding tools will observe reuse of the manufacturing key for multiple onboarding events. Use of the same manufacturing key to onboard multiple devices is an attack signature. As a security consequence, an onboarding tool has conflicting (exploitable) requirements.

c) Non-OCF functionality may be hosted by platforms that host OCF Devices, and a manufacturing certificate must be used for both OCF and non-OCF functions. Different ecosystems should agree on platform trust attributes. As a security consequence, misunderstood trust semantics may be exploitable by a confused deputy.

To address these security concerns, the present techniques and configuration introduce hosting of OCF devices in an interoperable trusted platform. As one example, Trusted Computing Group (TCG) defines specifications for interoperable trusted platforms, in the form of: (a) TPM—with manufacturing keys, embedding, storage, use (aka "attestation") and trust; (b) Trusted microcontroller units (MCUs)—Trust features applied to MCU environments; (c) Attestation protocols—proof of trustworthiness to a network peer; (d) Binding of trusted platform to software; and (e) Extensible certificate profiles: (e.g., TPM (aka Endorsement Key) credential—Binding of manufacturing key to TPM or T-MCU, Platform attribute credential—Binding of TPM/T-MCU to platform, or Certificate extensions that capture trust and quality attributes).

TCG specifications have broad industry adoption. For instance, major computer ODMs, OEMs, OSVs and ISVs deliver TCG compliant products, and TCG credentials issued by many existing CAs. Multiple open source software implementations available. With the presently described configurations, an OCF deployment may be adapted to intemperate with TCG compliant platforms.

Figure 3:
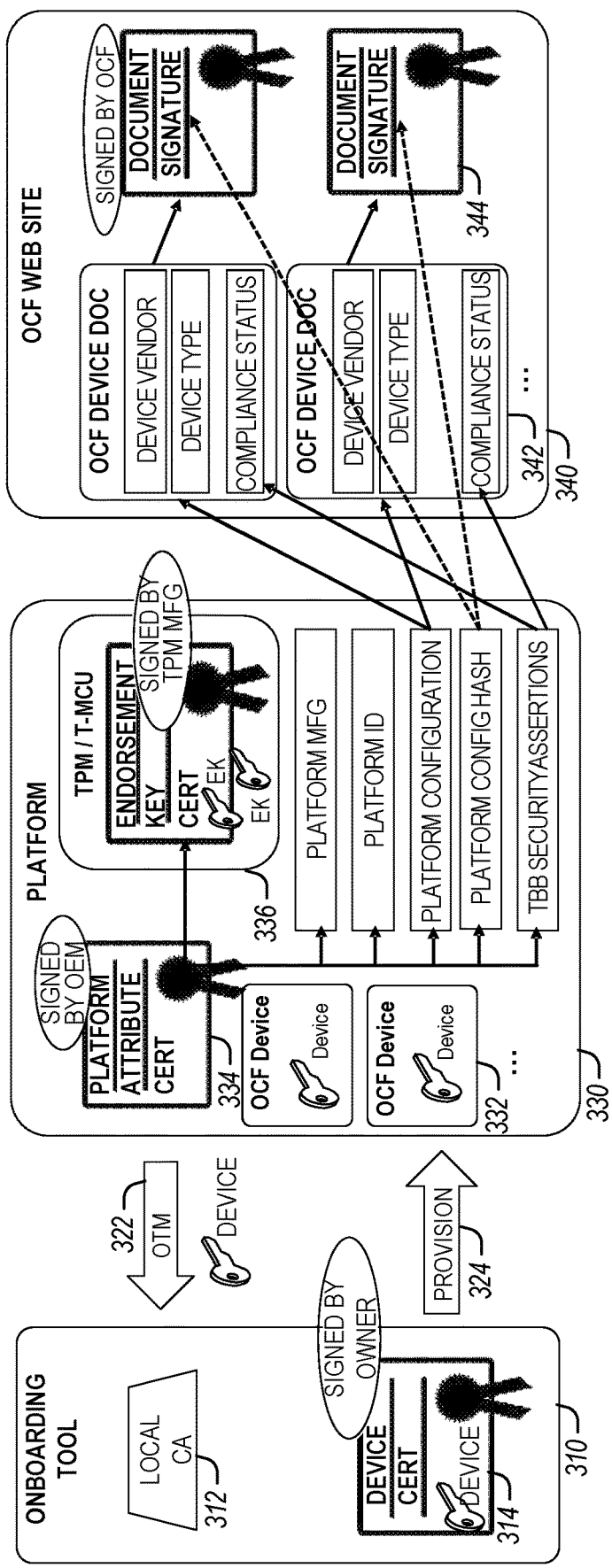
FIG. 3 illustrates a configuration and operation of OCF devices hosted on a Trusted Platform, according to an example.

FIG. 3 illustrates a configuration and operation of OCF devices hosted on an example Trusted Platform 330. In this example, the platform 330 may include a TCG platform credential 334 (e.g., implemented by TCG features such as TPM, T-MCU, in a Platform Attribute Cert instance), with links to compliance documentation 342. As shown, the platform 330 may operate to determine the validity of various certificates, and enable an onboarding tool 310 to proceed with use of a valid device certificate. Also, in an example, for each OCF Device (332) instance there may be a corresponding platform certificate 334 where the first platform credential may reference a first OCF Device Doc (e.g., a first document 342) and a second platform credential may reference a second OCF Device Doc (e.g., a second document). Both platform certificates may reference the same endorsement key certificate 336 (EK cert).

As shown, the TCG platform credential 334 of the platform 330 is linked to a number of platform characteristics, such as identifiers, configurations, data values, and security assertions. These characteristics are in turn linked to the documentation 342 provided from an organization website 340 (such as an OCF web site). Information such as device vendor, device type, and compliance status, are maintained in a signed document 344. This signed document 344 is signed by a trusted organization (such as OCF). As also shown, information such as security assertions may be provided in compliance status of the signed document 344; platform configuration information may also be provided in the signed document 344.

Relative to a common root CA, a TCG 'verifier' operating within the platform 330 is not highly constrained. Rather, the TCG features (e.g., TPM, T-MCU) may be used to evaluate platform and endorsement key credentials, trust assertions, quality assertions, even as platform owners already manage the platform for other reasons. Additionally, the list of trust anchors for TCG CAs is small compared to other trust attributes.

In this configuration, the onboarding tool 310 also is not "highly constrained". Rather, the onboarding tool 310 implements all defined owner transfer methods 322 for respective devices (e.g., as defined in the OCF specification), maintains a list 314 of 'owned' and trusted OCF devices 332 of the platform 330, provisions 324 new devices with local credentials (e.g., through use of a Local CA 312) and ACLs, manages many aspects of the OCF Device lifecycle, and may even be certified by multiple root CAs.

With the configuration of FIG. 3, trust anchor provisioning is viable for IoT device deployments, as may be implemented through use of IETF Trust Anchor Management Protocol (RFC 5934). Trust anchor provisioning keeps OCF-approved trust anchors up-to-date; the OCF specification may also define other meaningful defaults. Additionally, OCF devices 332 may store multiple roots in secure read-write memory. Platform vendors may embed such information if they choose.

In addition to the operations depicted in FIG. 3, various operational sequences may be utilized to enable device conformance, platform conformance, trusted booting, trusted/attested onboarding, and device operations, as discussed with the following flowcharts.

Figure 4:
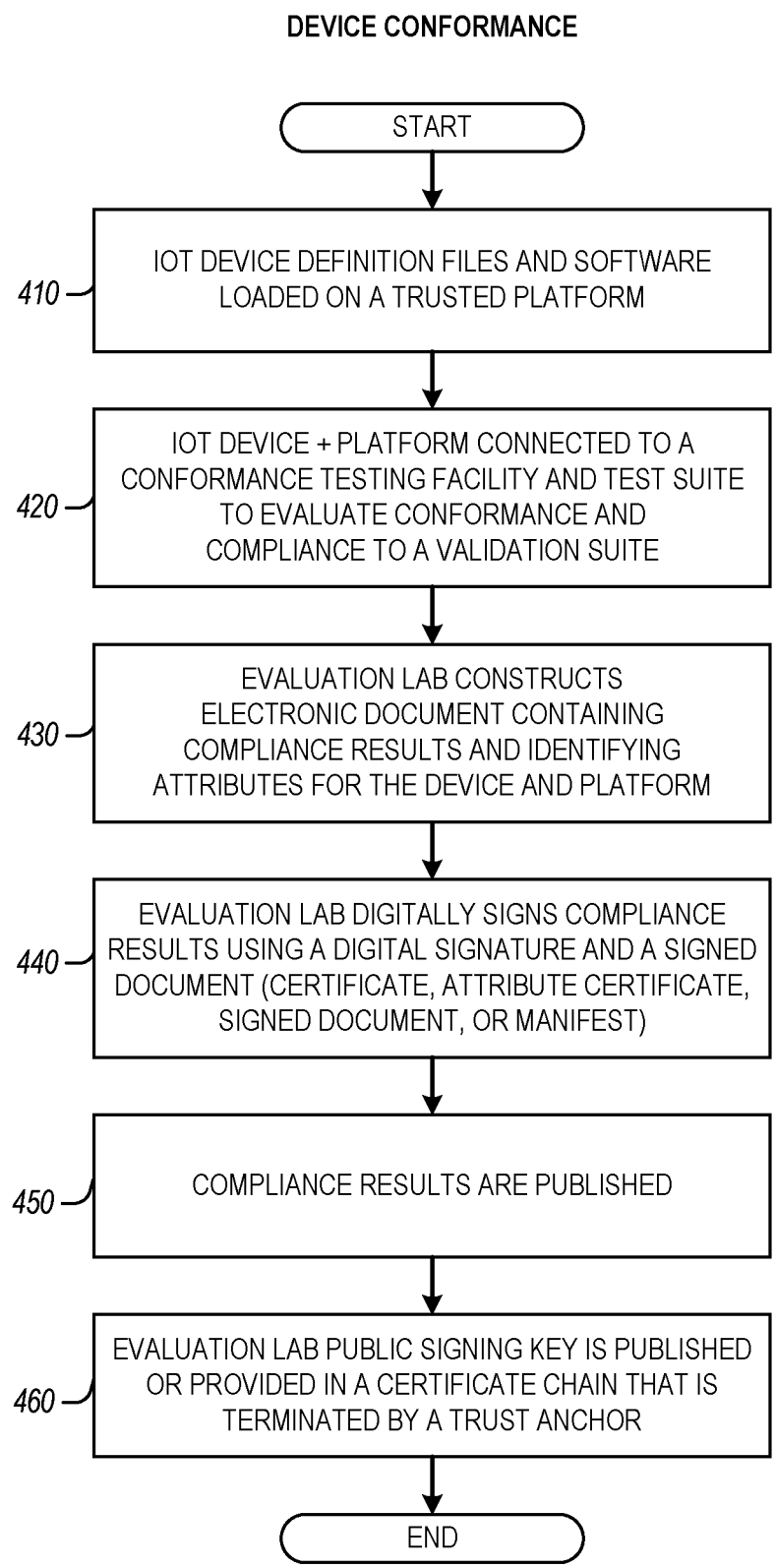
FIG. 4 illustrates a flowchart of a procedure for device conformance, for use of devices in a Trusted Platform, according to an example.

FIG. 4 illustrates a flowchart of an example procedure for device conformance, for use of devices in a Trusted Platform. Specifically, in the example of FIG. 4, this process describes steps a vendor must follow in order to have "quality assertions" created for a device that is hosted on a trusted platform. An evaluation lab may sign evaluation results and may possess a signing key/certificate path that is rooted by a CA that is distinct from any other CA this invention might reference.

The Device Conformance evaluation test lab may identify a 'security profile' that the IoT Device conforms to, given the OCF Device Software running on a Trusted Platform (as defined by FIG. 5, discussed below).

In an example, a procedure for a device conformance (e.g., as depicted in FIG. 4) may include:

Operation 410: IoT Device definition files and software are loaded on a trusted platform (such as a TCG defined Platform).

Operation 420: The IoT Device and Platform are connected to a conformance testing facility and test suite that evaluates conformance and compliance to a validation suite. Such a facility and test suite is referred to as an evaluation lab.

Operation 430: The evaluation lab constructs an electronic document (e.g., JSON. XML, HTML. ASN.1 etc. . . . ) containing compliance results and identifying attributes for the Device and Platform. (These need not identify the instance but rather the type or model).

Operation 440: The evaluation lab digitally signs evaluation results using a digital signature and a signed document such as a certificate (e.g., RFC5280), attributed certificate (e.g., RFC3281), signed document (e.g., RFC8152. Object Security for Constrained RESTful Environments (OSCORE) internet draft, RFC5652), or manifest.

Operation 450: The evaluation lab results are published (e.g., posted to a web site, published in a certificate, and/or contributed to a public blockchain).

Operation 460: The evaluation lab public signing key may be published (as performed in operation 450) or stored in a certificate chain that is terminated by a trust anchor.

Figure 5:
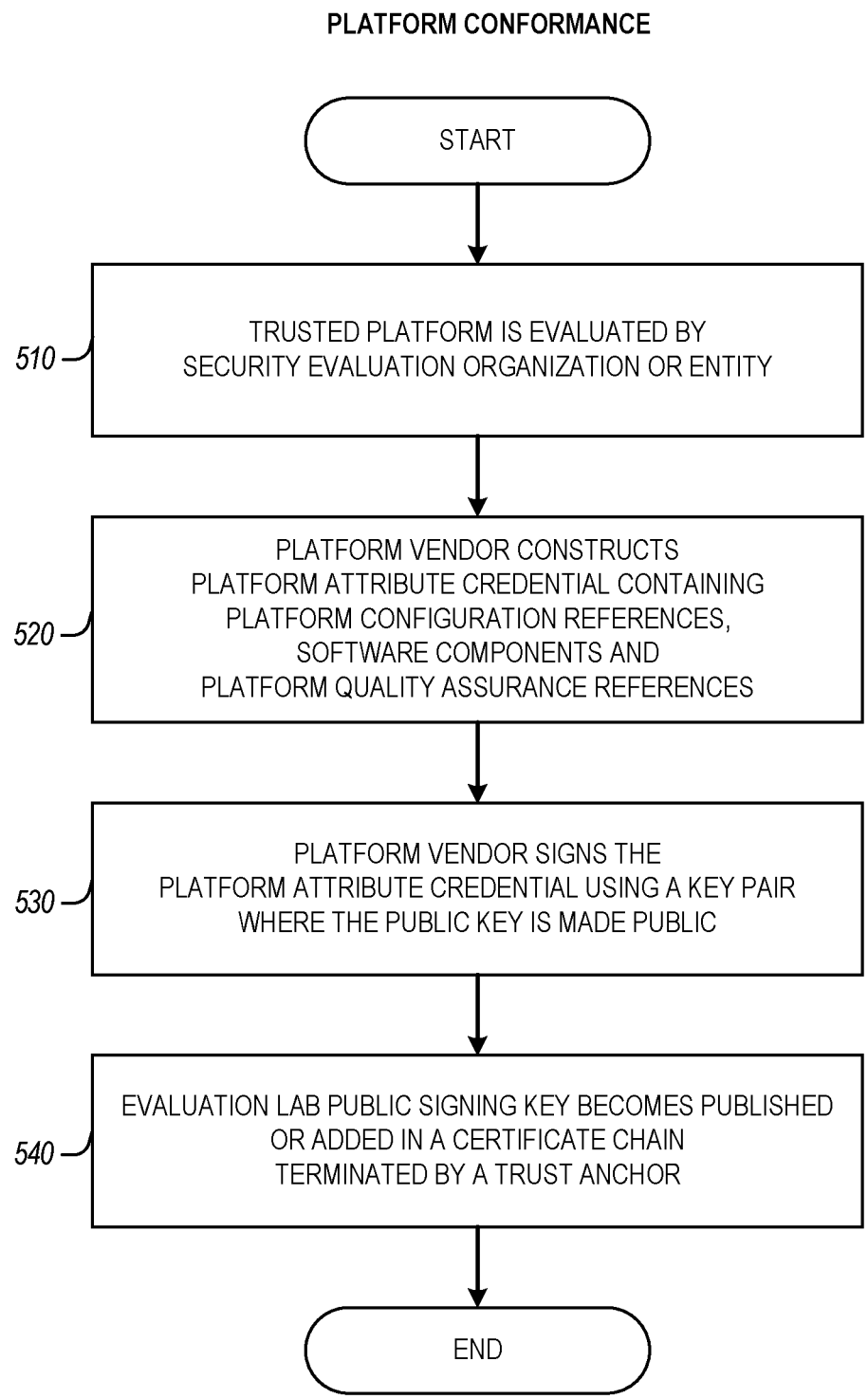
FIG. 5 illustrates a flowchart of a procedure for platform conformance, for use of a Trusted Platform, according to an example.

FIG. 5 illustrates a flowchart of an example procedure for platform conformance, for use of a Trusted Platform. Specifically, in the example of FIG. 5, this process describes operations (largely established by TCG) that a platform vendor follows to establish trust in a platform configuration. Such a platform configuration may include a Trusted Platform Module (TPM) or Trusted MCU (TMCU) where TPM/TMCU have a manufacturer embedded key also known as the "EK". The TPM/TMCU vendor may obtain an EK certificate/certificate path that is rooted by a CA that is distinct from any other CA. The Platform Attribute Cert (PAC) may be issued by a trusted platform vendor and may have a certificate path that is rooted by a CA that is distinct from any other CA.

In an example, a procedure for a platform conformance (e.g., as depicted in FIG. 5) may include:

Operation 510: A trusted platform (such as TCG defined Platform) is evaluated by a platform vendor, evaluation lab (e.g. common criteria), or other security evaluation organization or entity.

Operation 520: The platform vendor constructs a Platform Attribute Credential (such as TCG PAC) containing Platform Configuration references (e.g., URIs to hardware components (e.g., vendor, model and version), software components (e.g. vendor, model, version), and Platform Quality Assurance references (e.g., URIs to evaluation labs hosting public documents/signed documents describing what software evaluated using which trusted platform definition)).

Operation 530: The platform vendor signs the PAC using a key pair where the public key is made public (as discussed in previous operations).

Operation 540: The evaluation lab public signing key may be published (as performed in operation 530) or contained in a certificate chain that is terminated by a trust anchor.

Figure 6:
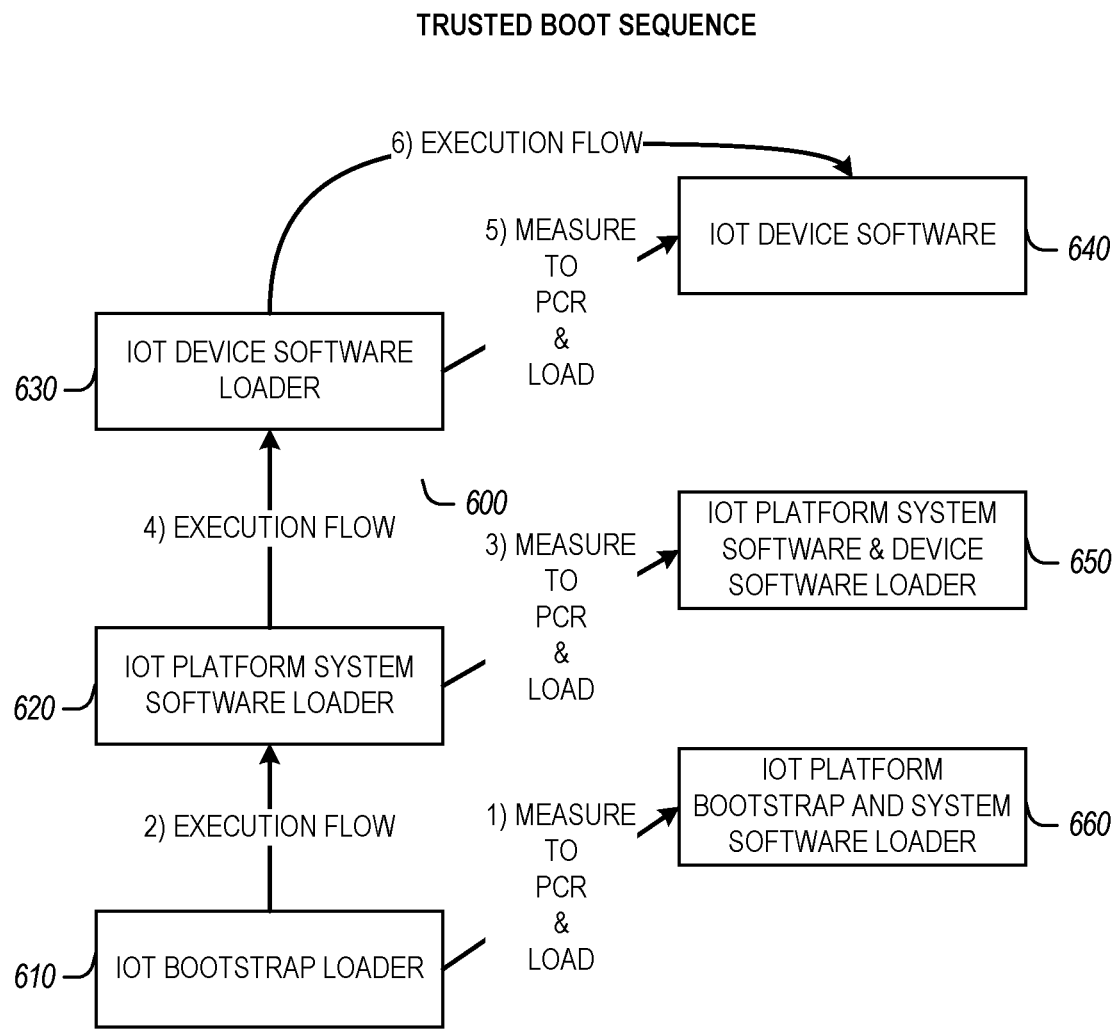
FIG. 6 illustrates a flowchart of a trusted boot sequence, for devices in a Trusted Platform, according to an example.

FIG. 6 illustrates a flowchart of an example trusted boot sequence, for devices in a Trusted Platform. Specifically, the flowchart of FIG. 6 shows a "Trusted Boot" sequence (which is an industry term of art) that shows a bootstrap process that includes an IoT Device loader 630 which may load an OCF Device software 640 and configuration files. This process may measure the software (to one or more platform configuration registers (PCRs)) and config files before passing execution to the software entry point. Further, this process may measure to the PCRs for each respective phase.

In an example, a procedure for a trusted boot sequence (e.g., as depicted in FIG. 6) may include an iterative process to launch an IoT bootstrap loader. IoT platform system software loader, and IoT device software loader, and the measurement of the loader and such software code to respective platform configuration registers (PCRs). As shown, the trusted boot sequence may begin with an IoT firmware (bootstrap) loader 610 used to load (1) the IoT platform firmware and system software loader 660. This is followed by an execution flow (2) to the IoT platform system software loader 620 used to load (3) the IoT platform system software and device software loader 650. This is followed by the execution flow (4) to the IoT device software loader 630, which loads (5) the IoT device software 640 and passes execution to the entry point of this software. Execution flow (6) continues with the IoT device software 640.

As shown in the example of FIG. 6, various components that make up the trusted platform and the IoT device it hosts are "bound" to one another. Binding here is evidenced in the form of trusted loading of the IoT Device Software 640. In some constrained environments there may be only one hybrid image consisting of firmware, system software, and device software. This conflates the trusted boot sequence into fewer operations, but the PCR(s) still contain the measurements needed for trusted and attested onboarding (as discussed with reference to FIG. 7, below).

Figure 7:
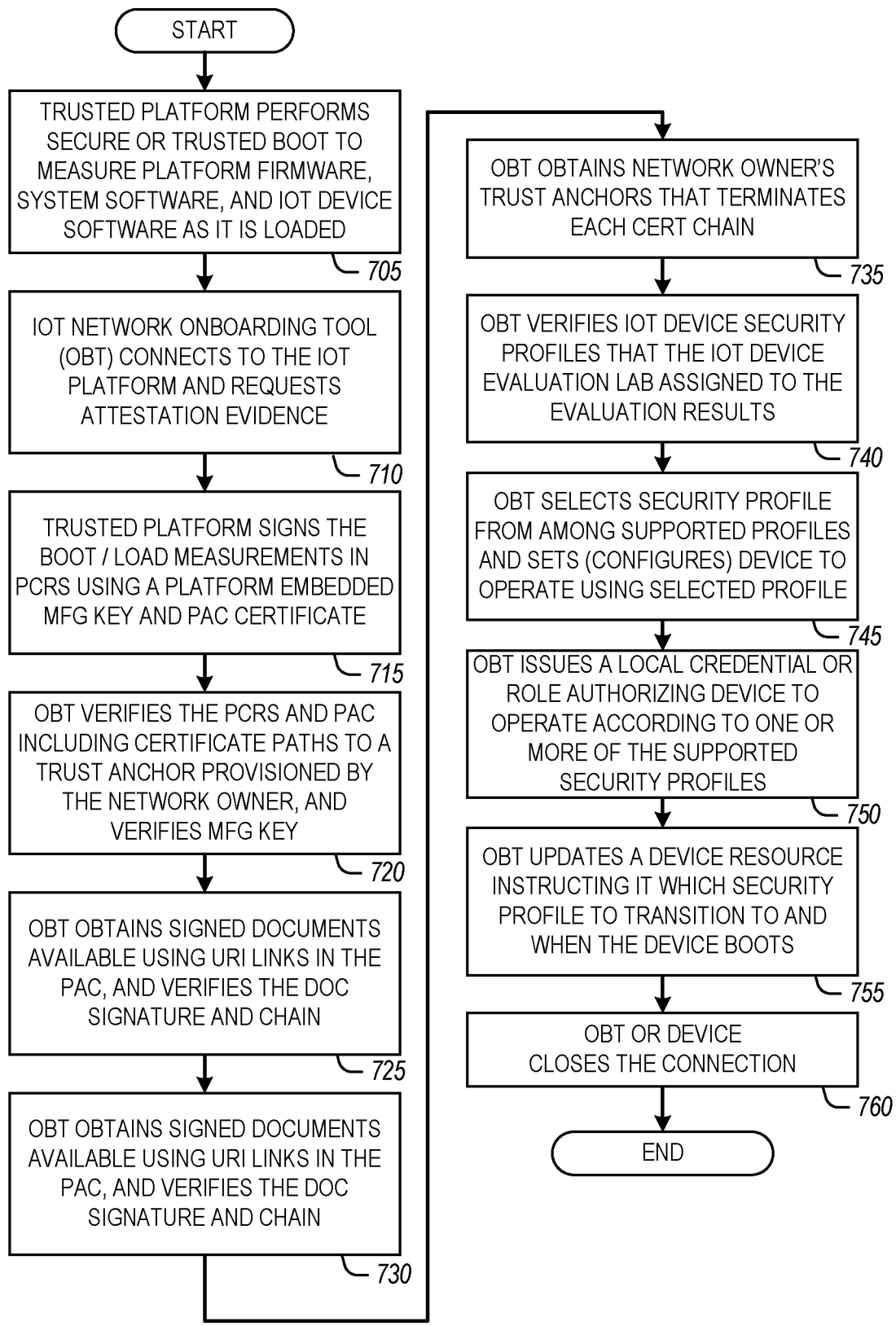
FIG. 7 illustrates a flowchart of a procedure for trusted or attested device onboarding, for devices in a Trusted Platform, according to an example.

FIG. 7 illustrates a flowchart of an example procedure for trusted or attested device onboarding, for devices in a Trusted Platform. Specifically, the procedure depicted in FIG. 7 shows OBT onboarding steps involving a new device that hopes to be onboarded with rights to operate at one or more of the security profiles that were asserted to be valid by a device conformance process (e.g., as depicted in FIG. 4, discussed above).

In an example, a procedure for trusted or attested device onboarding (e.g., as depicted in FIG. 7) may include:

Operation 705: A trusted platform performs a secure or trusted boot that measures the platform firmware, system software and the IoT Device software as it is loaded.

Operation 710: An IoT Network onboarding tool (OBT) connects to the IoT platform and requests attestation evidence.

Operation 715: The trusted platform signs the boot/load measurements in PCRs using a platform embedded manufacturing key (e.g. TPM EK or AIK) and the PAC certificate.

Operation 720: The OBT verifies the PCRs and PAC including certificate paths to a trust anchor provisioned by the network owner. This includes verification of the manufacturing (mfg) key (which may follow a separate certificate path).

Operation 725: The OBT obtains signed documents available using URI links in the PAC; and verifies the doc signature and chain (which may follow a separate certificate path).

Operation 730: The OBT obtains signed documents available using URI links in the PAC; and verifies the doc signature and chain (which may follow a separate certificate path).

Operation 735: The OBT obtains the network owner's trust anchors that terminates each certificate chain (Owner does this by reading from any of the public sources and evaluates legitimacy of public keys.)

Operation 740: The OBT verifies the IoT Device security profiles that the IoT Device evaluation lab assigned to the evaluation results.

Operation 745: The OBT selects a security profile from among the profiles the device supports and sets (configures) the device to operate using the OBT selected profile.

Operation 750: The OBT issues a local credential or role authorizing the device to operate according to one or more of the supported security profiles.

Operation 755: The OBT updates a Device Resource instructing it which security profile to transition to when the Device boots.

Operation 760: The OBT or device closes the connection.

Figure 8:
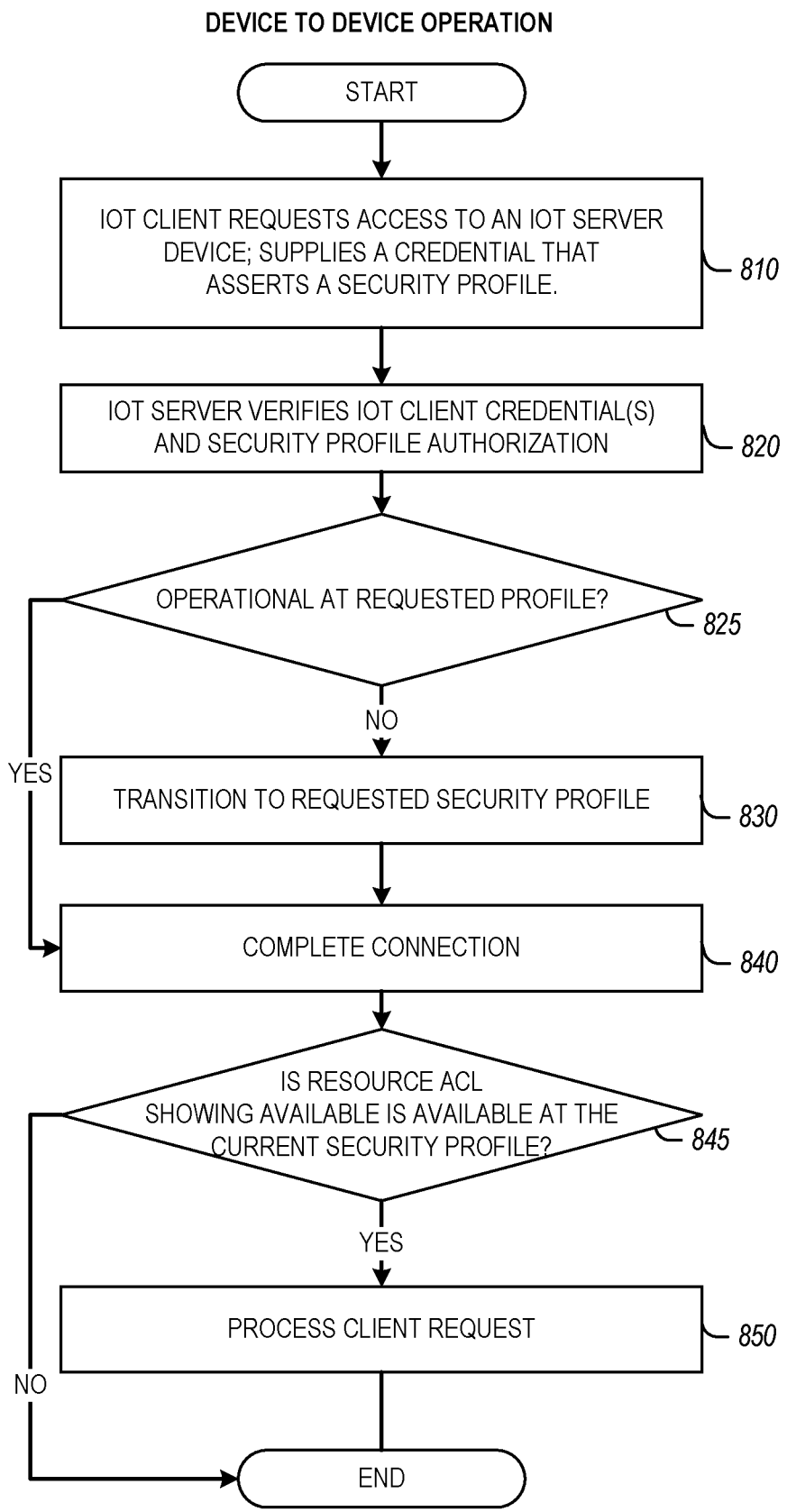
FIG. 8 illustrates a flowchart of device-to-device operations, for devices in a Trusted Platform, according to an example.

FIG. 8 illustrates a flowchart of example device-to-device operations, for devices in a Trusted Platform. Specifically, the procedure depicted in FIG. 8 shows a scenario where an IoT Client requests access to a Resource hosted by an IoT Server where the Resource is accessible only with the Server is operating at a specific security profile.

In this scenario, the Client supplies a credential (issued by the OBT or local CA) that authorizes the Client to operate at a specific security profile. The Server attempts to transition to the expected security profile and tries to satisfy the request. The local OBT/CA may issue local certificates, or role certificates where the certificate path may be terminated by a CA that none of the other diagrams use to terminate the path. The OBT and IoT Server(s) use a "trust anchor policy" that the network owner provisions that is used to terminate the various cert chains used during onboarding and device-to-device operation.

In an example, the example procedure for trusted or attested device onboarding may include a sequence of:

Operation 810: The IoT Client requests access to an IoT Server device; and supplies a credential that asserts a security profile.

Operation 820: The IoT Server verifies IoT Client credential and security profile authorization.

Operation 825: A determination is made, to identify whether the client is operational at the requested profile. If not already operational at requested profile, then a transition is made to a requested security profile at 830. This connection is then completed at 840.

Operation 845: A determination is made whether the Resource ACL showing available is available at the current security profile. If this is available, then the client request is processed, at operation 850.

Figure 9:
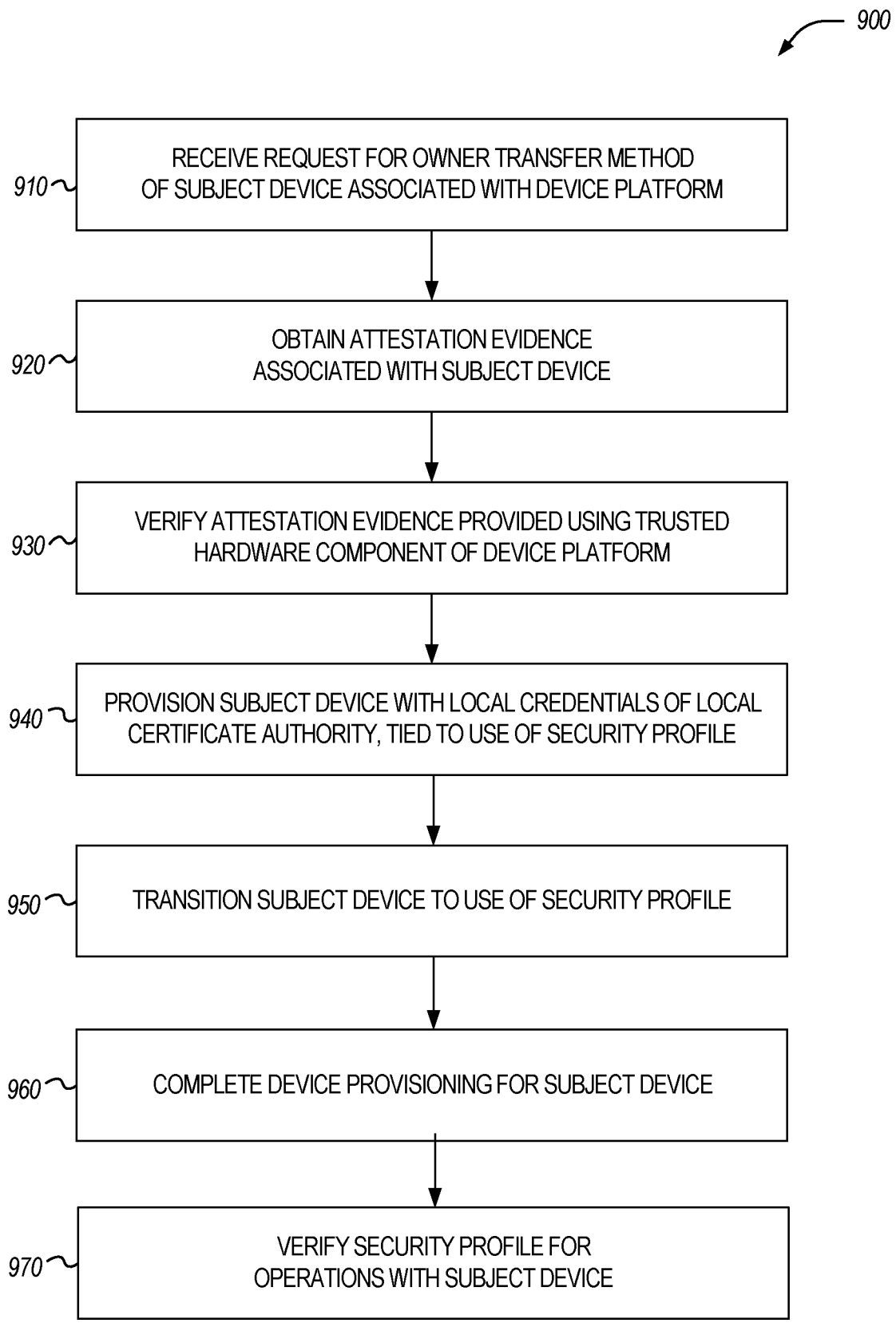
FIG. 9 illustrates a flowchart of a method for onboarding a subject device for use with a security profile, according to an example.

FIG. 9 illustrates a flowchart 900 of an example method for onboarding a subject device for use with a security profile. As illustrated, the operations of the flowchart 900 are illustrated from the perspective of an onboarding tool device, which operates to onboard respective new (subject) devices onto use of a device platform (e.g., an OCF platform). It will be understood that these operations may be distributed among multiple entities or actors, in some examples, and such operations may be modified using any of the alternative security approaches discussed in the examples herein.

The flowchart 900 begins with operations at 910 to receive a request (e.g., at the onboarding tool device) to perform an owner transfer method (e.g., as part of onboarding operations) of a subject device associated with a device platform. This is followed at 920 with operations to obtain attestation evidence associated with the subject device, and operations at 930 to verify the attestation evidence. In an example, the attestation evidence is provided by the device platform, and the attestation evidence is signed by a certificate produced using a manufacturer-embedded key. Further, the manufacturer-embedded key may be provided from a trusted hardware component of the device platform, as the device platform operates trusted hardware and includes relevant trust attestation information for operations and hardware.

The flowchart 900 continues with operations at 940 to provision the subject device, such as with the use of local credentials issued from a local certificate authority. In an example, the local certificate authority is operated by the onboarding tool device. Also in an example, the local credentials indicate a verified use of the security profile tied to manufacturer-embedded keys. The flowchart 900 then continues with operations at 950 to transition the subject device to use of a specified security profile. In an example, this includes updating a resource of the subject device to a value associated with the security profile, such that the subject device is transitioned to use of the security profile upon completion of the device provisioning. In an example, this may also include the onboarding tool device maintaining a list of owned and trusted devices of the device platform, such as updating the list to include the subject device.

The flowchart 900 concludes with operations at 960 to complete device provisioning for the subject device, as the subject device is configured to operate with use of the security profile. Finally, subsequent operations with the subject device (and in the network platform, and any defined network domain) may include the verification of the security profile.

In further examples, the onboarding tool device, the device platform, and/or the subject device are configured and/or operable according to a specification of an Open Connectivity Foundation (OCF) standards family. Further, the trusted hardware component, the onboarding tool device, and other aspects of the device platform and/or subject device are configured and/or operable according to specification of a Trusted Computing Group (TCG) standards family.

In a further example, the subject device conducts a trusted boot sequence of device software for operation on the subject device, and the attestation evidence includes the verification of the trusted boot sequence by the device platform. Also in further examples, the manufacturer-embedded key is associated with a trust anchor, such that the trust anchor is managed through use of a trust anchor management protocol. Also in further examples, the manufacturer-embedded key is linked to a certificate chain, and the certificate chain is terminated by a trust anchor, such that the attestation evidence includes the trust anchor. Also in further examples, the manufacturer-embedded key is associated with a platform attribute credential of the device platform, and the platform attribute credential includes platform information that is publicly verifiable at a third party data source. In still further examples, verification may include querying a blockchain to confirm a trust anchor linked to the manufacturer-embedded key, or querying the blockchain to search for a trust anchor revocation for the trust anchor linked to the manufacturer-embedded key. The identification of a trust anchor revocation may result in causing the subject device to use another security profile.

In specific examples, the techniques discussed herein may be implemented in an OCF deployment as part of a security profile assignment (e.g., during device onboarding). OCF Devices may have been evaluated according to an OCF Security Profile. Evaluation results could be accessed from a manufacturer's certificate, OCF web server or other public repository. The DOTS reviews evaluation results to determine which OCF Security Profiles that the OCF Device is authorized to possess and configures the Device with the subset of evaluated security profiles best suited for the network owner's intended network segmentation strategy. The following paragraphs provide additional details regarding a possible implementation with reference to OCF resources and resource properties.

In an example, the techniques discussed herein may be incorporated in a security profile referred to as the "Security Profile Blue". The Security Profile Blue is used when manufacturers issue platform certificates for platforms containing manufacturer-embedded keys. Compatibility with interoperable trusted platforms is anticipated using certificate extensions defined by the Trusted Computing Group (TCG). Network owners evaluate manufacturer supplied certificates and attributed data to determine an appropriate OCF Security Profile that is configured for OCF Devices at onboarding. OCF Devices may satisfy multiple OCF Security Profiles. The network owner may configure network deployments using the Security Profile as network partitioning criteria.

The OCF "Security Profile Blue" anticipates an ecosystem where platform vendors may differ from the OCF Device vendor and where platform vendors may implement trusted platforms that may conform to industry standards defining trusted platforms. The OCF Security Profile Blue specifies mechanisms for linking platforms with OCF Device(s) and for referencing quality assurance criteria produced by OCF conformance operations. The network owner evaluates these data when an OCF Device is onboarded into the network. Based on this evaluation the network owner determines which Security Profile shall be applied during OCF Device operation. All OCF Device types may be considered for evaluation using the OCF Security Profile Blue.

In an example, OCF Security Profile Blue defines the following quality assurances: The OCF Conformance criteria shall require vendor attestation that the conformant OCF Device was hosted on one or more platforms that satisfied OCF Security Profile Blue security assurances and security and privacy functionality requirements. In an example, OCF Security Profile Blue defines the quality assurance functionality as: the results of OCF Conformance testing and Security Profile compliance are published to an OCF web site; and the results of OCF Conformance testing and Security Profile compliance are digitally signed by an OCF owned signing key.

In an example, OCF Security Profile Blue defines the following security assurances: Platforms implementing cryptographic service provider functionality and secure storage functionality shall be evaluated with a minimum FIPS140-2 Level 1 or Common Criteria EAL Level 1. Platforms implementing trusted platform functionality should be evaluated with a minimum Common Criteria EAL Level 1.

In an example, OCF Security Profile Blue defines the following security and privacy functionality: OCF Device(s) shall use cryptographic algorithms using a cryptographic service provider (CSP). CSP functionality shall include cryptographic algorithms, random number generation, secure time. OCF Device(s) shall use a secure storage provider for cryptographic key storage. OCF Device(s) shall use AES128 equivalent minimum protection for transmitted data and shall use platform hosted CSP for cryptographic algorithm functionality. OCF Device(s) shall use AES128 equivalent minimum protection for stored data and shall use platform hosted secure key storage functionality. OCF Device(s) shall protect the /oic/sec/cred resource using the platform secure storage provider. OCF Device(s) shall protect trust anchors (aka policy defining trusted CAs and pinned certificates) using platform secure storage functionality. OCF onboarding (aka DOTS) shall terminate certificate path validation of manufacturer certificates using the network owner authorized trust anchors. OCF onboarding (aka DOTS) shall check certificate revocation status for all certificates in a manufacturer certificate path. OCF Device(s) should check certificate revocation status for locally issued certificates.

In an example, OCF Security Profile Blue defines security and privacy functionality for a platform. Platform hosting OCF Device(s) should implement a platform identifier following IEEE802.1AR or TCG Trusted Platform Module (TPM) specifications. Platforms hosting OCF Device(s) may implement TCG-defined trusted platform security assertion extension:

tBBSecurityAssertions ATTRIBUTE::={
        WITH SYNTAX TBBSecurityAssertions
        ID tcg-at-tbbSecurityAssertions
    }

Platforms hosting OCF Device(s) may implement TCG-defined platform configuration assertion extension:

platformConfiguration ATTRIBUTE::={
        WITH SYNTAX PlatformConfiguration
        ID tcg-at-platformConfiguration-v1
    }

In an example, the OCF Device vendor sets a manufacturer default value for the supported_profiles and the active_profile Properties of a /oic/sec/sp Resource to "oic.sec.sp.unspecified". The default value is re-asserted when the Device transitions to RESET Device State. The OCF Device allows the /oic/sec/sp_update Resource to be updated exclusively when the Device is in one of the following Device States: RFOTM, RFPRO, SRESET.

In an example, the DOTS updates the supported_profiles Property of the /oic/sec/sp_update Resource with a subset of the OCF Security Profiles values the Device achieved as part of OCF Conformance testing. The DOTS may locate conformance results by inspecting manufacturer certificates supplied with the OCF Device by selecting credentials that have a 'credusage' Property value of "oic.sec.cred.mfgcert". The DOTS may further locate conformance results by visiting a well-known OCF web site URI corresponding to the platform. OCF Device type and respective platform and OCF Device vendors. The DOTS may select a subset of Security Profiles (from those evaluated by OCF conformance testing) based on a local policy.

In an example, the DOTS updates the current_profile Property of the /oic/sec/sp_update Resource with the value that most correctly depicts the network owner's intended network segmentation strategy. The CMS may issue role credentials using the Security Profile value (e.g. "oic.sec.sp.blue") to indicate the network owner's intention to segment the network according to a Security Profile. The CMS retrieves the supported_profiles Property of the /oic/sec/sp Resource to select role names corroborated with the Device's supported security profiles when issuing role credentials. If the CMS issues role credentials based on Security Profile, the AMS should supply access control entries that include the role designation(s).

Also in an example, the oic.sec.sp Resource is used by the OCF Device to show which OCF Security Profiles are authorized by the network owner and which OCF Security Profile is currently operational. A Security Profile Resource Definition may be provided through the properties of the oic.sec.sp Resource, and the oic.sec.sp_update resource. For instance, a Security Profile Resource Definition may be provided through the values of the oic.sec.sp Properties of the /oic/sec/sp Resource (in both R and RW access modes), which indicates an array of supported security profiles, and a security profile currently active.

Variations to the preceding platforms, security and privacy functionality, certification requirements, security profiles, and implementations in an OCF specification or other IoT network deployment may also occur.

In various examples, the operations and functionality described above with reference to FIGS. 3 to 9 may be embodied by an IoT device machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the examples above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor, set of processors, or processing circuitry (e.g., a machine in the form of a computer, IoT processing device, etc.) to individually or jointly execute instructions to perform any one or more of the methodologies discussed herein. Accordingly, in various examples, applicable means for processing (e.g., processing, controlling, generating, evaluating, etc.) may be embodied by such processing circuitry.

Figure 10:
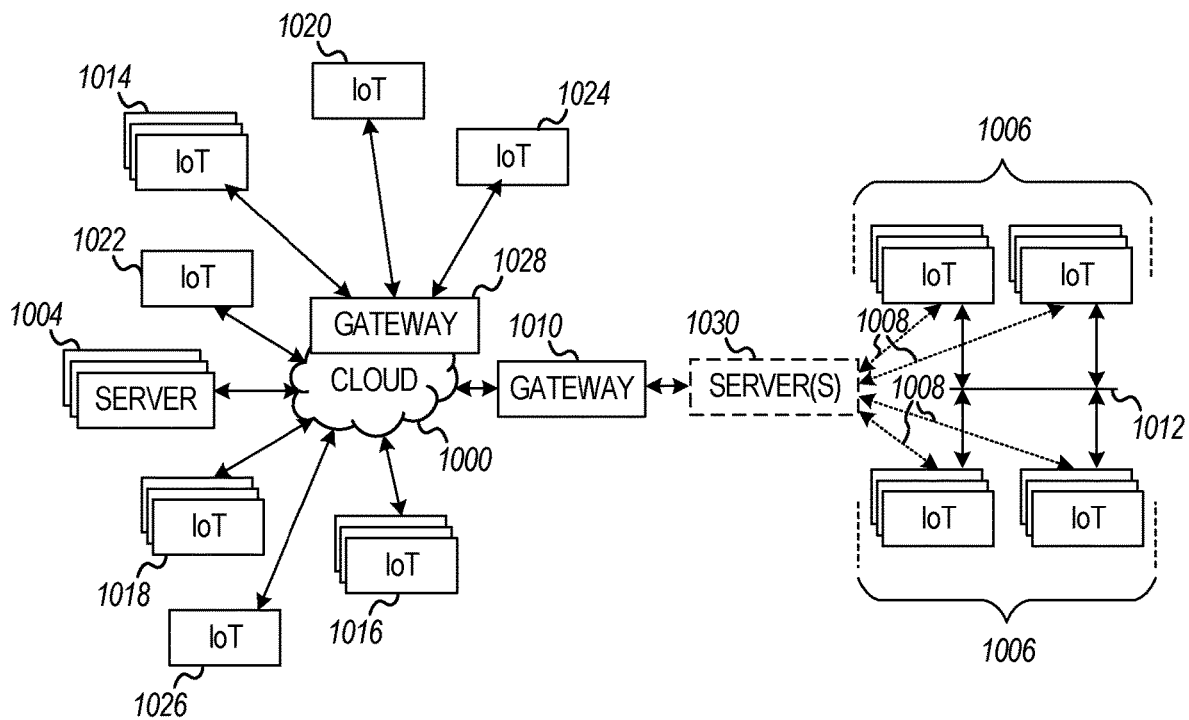
FIG. 10 illustrates a block diagram of a network illustrating communications among a number of IoT devices, according to an example.

FIG. 10 illustrates a drawing of a cloud computing network, or cloud 1000, in communication with a number of Internet of Things (IoT) devices. The cloud 1000 may represent the Internet, or may be a local area network (LAN), or a wide area network (WAN), such as a proprietary network for a company. The IoT devices may include any number of different types of devices, grouped in various combinations. For example, a traffic control group 1006 may include IoT devices along streets in a city. These IoT devices may include stoplights, traffic flow monitors, cameras, weather sensors, and the like. The traffic control group 1006, or other subgroups, may be in communication with the cloud 1000 through wired or wireless links 1008, such as LPWA links, optical links, and the like. Further, a wired or wireless sub-network 1012 may allow the IoT devices to communicate with each other, such as through a local area network, a wireless local area network, and the like. The IoT devices may use another device, such as a gateway 1010 or 1028 to communicate with remote locations such as the cloud 1000; the IoT devices may also use one or more servers 1030 to facilitate communication with the cloud 1000 or with the gateway 1010. For example, the one or more servers 1030 may operate as an intermediate network node to support a local edge cloud or fog implementation among a local area network. Further, the gateway 1028 that is depicted may operate in a cloud-to-gateway-to-many edge devices configuration, such as with the various IoT devices 1014, 1020, 1024 being constrained or dynamic to an assignment and use of resources in the cloud 1000.

Other example groups of IoT devices may include remote weather stations 1014, local information terminals 1016, alarm systems 1018, automated teller machines 1020, alarm panels 1022, or moving vehicles, such as emergency vehicles 1024 or other vehicles 1026, among many others. Each of these IoT devices may be in communication with other IoT devices, with servers 1004, with another IoT fog device or system (not shown, but depicted in FIG. 2), or a combination therein. The groups of IoT devices may be deployed in various residential, commercial, and industrial settings (including in both private or public environments).

As can be seen from FIG. 10, a large number of IoT devices may be communicating through the cloud 1000. This may allow different IoT devices to request or provide information to other devices autonomously. For example, a group of IoT devices (e.g., the traffic control group 1006) may request a current weather forecast from a group of remote weather stations 1014, which may provide the forecast without human intervention. Further, an emergency vehicle 1024 may be alerted by an automated teller machine 1020 that a burglary is in progress. As the emergency vehicle 1024 proceeds towards the automated teller machine 1020, it may access the traffic control group 1006 to request clearance to the location, for example, by lights turning red to block cross traffic at an intersection in sufficient time for the emergency vehicle 1024 to have unimpeded access to the intersection.

Clusters of IoT devices, such as the remote weather stations 1014 or the traffic control group 1006, may be equipped to communicate with other IoT devices as well as with the cloud 1000. This may allow the IoT devices to form an ad-hoc network between the devices, allowing them to function as a single device, which may be termed a fog device or system (e.g., as described above with reference to FIG. 2).

Figure 11:
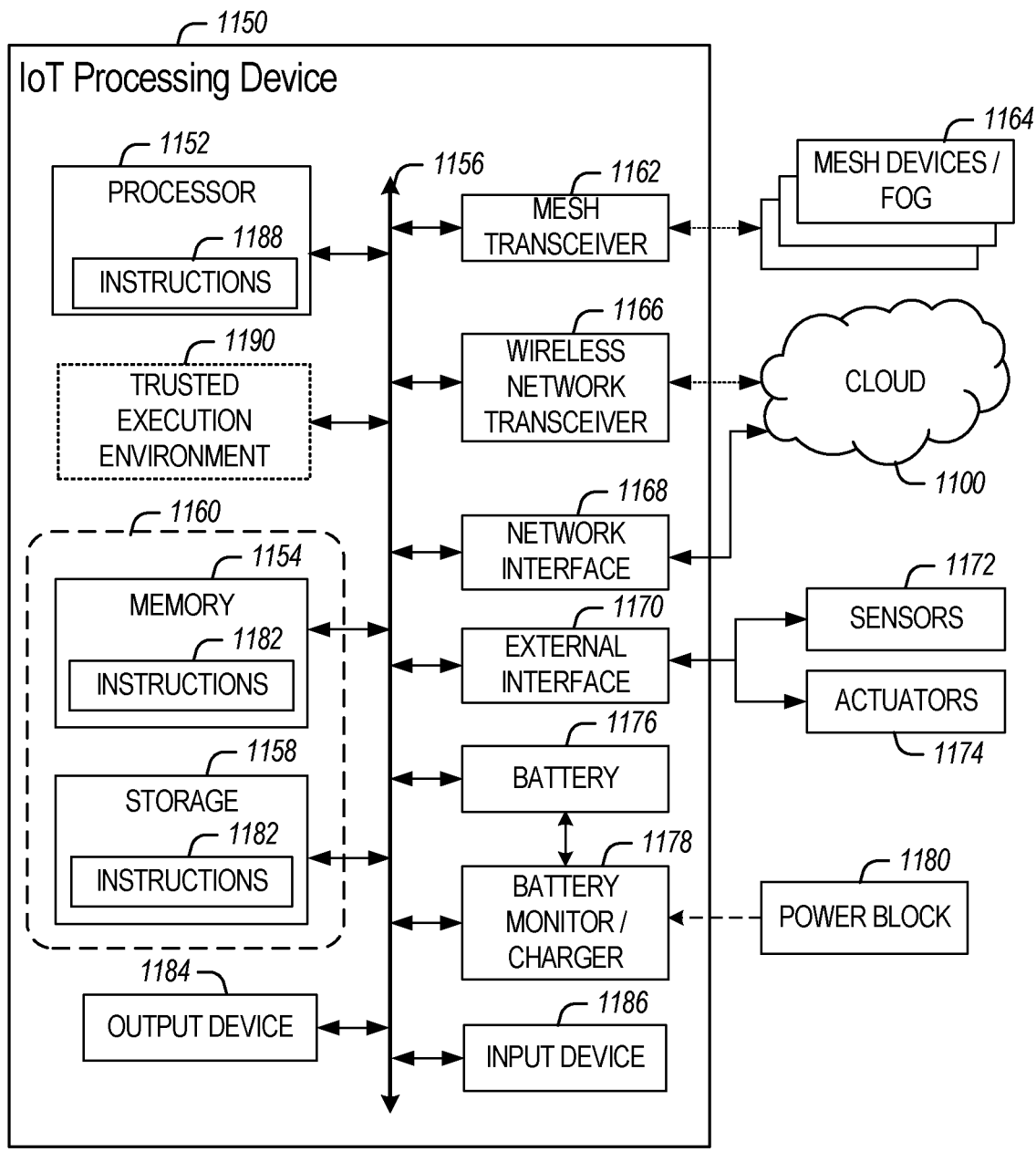
FIG. 11 illustrates a block diagram for an example IoT processing system architecture upon which any one or more of the techniques (e.g., operations, processes, methods, and methodologies) discussed herein may be performed.

FIG. 11 is a block diagram of an example of components that may be present in an IoT device 1150 for implementing the techniques described herein. The IoT device 1150 may include any combinations of the components shown in the example or referenced in the disclosure above. The components may be implemented as ICs, portions thereof, discrete electronic devices, or other modules, logic, hardware, software, firmware, or a combination thereof adapted in the IoT device 1150, or as components otherwise incorporated within a chassis of a larger system. Additionally, the block diagram of FIG. 11 is intended to depict a high-level view of components of the IoT device 1150. However, some of the components shown may be omitted, additional components may be present, and different arrangement of the components shown may occur in other implementations.

The IoT device 1150 may include processing circuitry in the form of a processor 1152, which may be a microprocessor, a multi-core processor, a multithreaded processor, an ultra-low voltage processor, an embedded processor, or other known processing elements. The processor 1152 may be a part of a system on a chip (SoC) in which the processor 1152 and other components are formed into a single integrated circuit, or a single package, such as the Edison™ or Galileo™ SoC boards from Intel. As an example, the processor 1152 may include an Intel® Architecture Core™ based processor, such as a Quark™, an Atom™, an i3, an i5, an i7, or an MCU-class processor, or another such processor available from Intel® Corporation, Santa Clara, California. However, any number other processors may be used, such as available from Advanced Micro Devices, Inc. (AMD) of Sunnyvale, California, a MIPS-based design from MIPS Technologies. Inc. of Sunnyvale. California, an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies. Inc., or an OMAP™ processor from Texas Instruments. Inc.

The processor 1152 may communicate with a system memory 1154 over an interconnect 1156 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1158 may also couple to the processor 1152 via the interconnect 1156. In an example the storage 1158 may be implemented via a solid state disk drive (SSDD). Other devices that may be used for the storage 1158 include flash memory cards, such as SD cards, microSD cards, xD picture cards, and the like, and USB flash drives. In low power implementations, the storage 1158 may be on-die memory or registers associated with the processor 1152. However, in some examples, the storage 1158 may be implemented using a micro hard disk drive (HDD). Further, any number of new technologies may be used for the storage 1158 in addition to, or instead of, the technologies described, such resistance change memories, phase change memories, holographic memories, or chemical memories, among others.

The components may communicate over the interconnect 1156. The interconnect 1156 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1156 may be a proprietary bus, for example, used in a SoC based system. Other bus systems may be included, such as an I2C interface, an SPI interface, point to point interfaces, and a power bus, among others.

The interconnect 1156 may couple the processor 1152 to a mesh transceiver 1162, for communications with other mesh devices 1164. The mesh transceiver 1162 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1164. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 1162 may communicate using multiple standards or radios for communications at different range. For example, the IoT device 1150 may communicate with close devices, e.g., within about 11 meters, using a local transceiver based on BLE, or another low power radio, to save power. More distant mesh devices 1164, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 1166 may be included to communicate with devices or services in the cloud 1100 via local or wide area network protocols. The wireless network transceiver 1166 may be a LPWA transceiver that follows the IEEE 802.15.4, or IEEE 802.15.4g standards, among others. The IoT device 1150 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 1162 and wireless network transceiver 1166, as described herein. For example, the radio transceivers 1162 and 1166 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 1162 and 1166 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 1166, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1168 may be included to provide a wired communication to the cloud 1100 or to other devices, such as the mesh devices 1164. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 1168 may be included to allow connect to a second network, for example, a NIC 1168 providing communications to the cloud over Ethernet, and a second NIC 1168 providing communications to other devices over another type of network.

Given the variety of types of applicable communications from the device to another component or network, applicable communications circuitry used by the device may include or be embodied by any one or more of components 1262, 1266, 1268, or 1270. Accordingly, in various examples, applicable means for communicating (e.g., receiving, transmitting, etc.) may be embodied by such communications circuitry.

The interconnect 1156 may couple the processor 1152 to an external interface 1170 that is used to connect external devices or subsystems. The external devices may include sensors 1172, such as accelerometers, level sensors, flow sensors, optical light sensors, camera sensors, temperature sensors, a global positioning system (GPS) sensors, pressure sensors, barometric pressure sensors, and the like. The external interface 1170 further may be used to connect the IoT device 1150 to actuators 1174, such as power switches, valve actuators, an audible sound generator, a visual warning device, and the like.

In some optional examples, various input/output (V/O) devices may be present within, or connected to, the IoT device 1150. For example, a display or other output device 1184 may be included to show information, such as sensor readings or actuator position. An input device 1186, such as a touch screen or keypad may be included to accept input. An output device 1184 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 1150.

A battery 1176 may power the IoT device 1150, although in examples in which the IoT device 1150 is mounted in a fixed location, it may have a power supply coupled to an electrical grid. The battery 1176 may be a lithium ion battery, or a metal-air battery, such as a zinc-air battery, an aluminum-air battery, a lithium-air battery, and the like.

A battery monitor/charger 1178 may be included in the IoT device 1150 to track the state of charge (SoCh) of the battery 1176. The battery monitor/charger 1178 may be used to monitor other parameters of the battery 1176 to provide failure predictions, such as the state of health (SoH) and the state of function (SoF) of the battery 1176. The battery monitor/charger 1178 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 1178 may communicate the information on the battery 1176 to the processor 1152 over the interconnect 1156. The battery monitor/charger 1178 may also include an analog-to-digital (ADC) convertor that allows the processor 1152 to directly monitor the voltage of the battery 1176 or the current flow from the battery 1176. The battery parameters may be used to determine actions that the IoT device 1150 may perform, such as transmission frequency, mesh network operation, sensing frequency, and the like.

A power block 1180, or other power supply coupled to a grid, may be coupled with the battery monitor/charger 1178 to charge the battery 1176. In some examples, the power block 1180 may be replaced with a wireless power receiver to obtain the power wirelessly, for example, through a loop antenna in the IoT device 1150. A wireless battery charging circuit, such as an LTC4020 chip from Linear Technologies of Milpitas, California, among others, may be included in the battery monitor/charger 1178. The specific charging circuits chosen depend on the size of the battery 1176, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1158 may include instructions 1182 in the form of software, firmware, or hardware commands to implement the techniques described herein. Although such instructions 1182 are shown as code blocks included in the memory 1154 and the storage 1158, it may be understood that any of the code blocks may be replaced with hardwired circuits, for example, built into an application specific integrated circuit (ASIC).

In an example, the instructions 1182 provided via the memory 1154, the storage 1158, or the processor 1152 may be embodied as a non-transitory, machine readable medium 1060 including code to direct the processor 1052 to perform electronic operations in the IoT device 1150. The processor 1152 may access the non-transitory, machine readable medium 1160 over the interconnect 1156. For instance, the non-transitory, machine readable medium 1160 may be embodied by devices described for the storage 1158 of FIG. 11 or may include specific storage units such as optical disks, flash drives, or any number of other hardware devices. The non-transitory, machine readable medium 1160 may include instructions to direct the processor 1152 to perform a specific sequence or flow of actions, for example, as described with respect to the flowchart(s) and block diagram (s) of operations and functionality depicted above.

In still a specific example, the instructions 1288 on the processor 1252 (separately, or in combination with the instructions 1288 of the machine readable medium 1260) may configure execution or operation of a trusted execution environment (TEE) 1290. In an example, the TEE 1290 operates as a protected area accessible to the processor 1252 for secure execution of instructions and secure access to data. Various implementations of the TEE 1290, and an accompanying secure area in the processor 1252 or the memory 1254 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 1250 through the TEE 1290 and the processor 1252.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 is a device, comprising: communications circuitry; processing circuitry; and a memory device including instructions embodied thereon, wherein the instructions, which when executed by the processing circuitry, configure the processing circuitry to perform operations comprising: receiving a request to perform an owner transfer method of a subject device, the subject device being associated with a device platform; verifying attestation evidence associated with the subject device, the attestation evidence provided by the device platform, wherein the attestation evidence is signed by a certificate produced using a manufacturer-embedded key, wherein the manufacturer-embedded key is provided from a trusted hardware component of the device platform; and performing device provisioning of the subject device, based on the attestation evidence, wherein the device provisioning causes the subject device to use a security profile tied to manufacturer-embedded keys.

In Example 2, the subject matter of Example 1 includes: maintaining a list of owned and trusted devices of the device platform, the list including the subject device.

In Example 3, the subject matter of Examples 1-2 includes, the subject matter wherein performing device provisioning includes further operations comprising: provisioning the subject device with local credentials from a local certificate authority, the local certificate authority operated by the device, wherein the local credentials indicate a verified use of the security profile tied to manufacturer-embedded keys.

In Example 4, the subject matter of Examples 1-3 includes, the subject matter wherein performing device provisioning includes further operations comprising: updating a resource of the subject device to a value associated with the security profile, wherein the subject device is transitioned to use of the security profile upon completion of the device provisioning.

In Example 5, the subject matter of Examples 1-4 includes, the subject matter wherein the manufacturer-embedded key is associated with a trust anchor, wherein the trust anchor is managed through use of a trust anchor management protocol.

In Example 6, the subject matter of Examples 1-5 includes, the subject matter wherein the manufacturer-embedded key is linked to a certificate chain, wherein the certificate chain is terminated by a trust anchor, and wherein the attestation evidence includes the trust anchor.

In Example 7, the subject matter of Examples 1-6 includes, the subject matter wherein the manufacturer-embedded key is associated with a platform attribute credential of the device platform, and wherein the platform attribute credential includes platform information that is publicly verifiable at a third party data source.

In Example 8, the subject matter of Examples 1-7 includes, querying a blockchain to confirm a trust anchor linked to the manufacturer-embedded key.

In Example 9, the subject matter of Example 8 includes: querying the blockchain to search for a trust anchor revocation for the trust anchor linked to the manufacturer-embedded key; and causing the subject device to use another security profile for the subject device based on identifying the trust anchor revocation.

In Example 10, the subject matter of Examples 1-9 includes, the subject matter wherein the subject device conducts a trusted boot sequence of device software for operation on the subject device, and wherein the attestation evidence includes verification of the trusted boot sequence by the device platform.

In Example 11, the subject matter of Examples 1-10 includes, the subject matter wherein the device is an onboarding tool, and wherein the device and the device platform are configured according to a specification of an Open Connectivity Foundation (OCF) standards family.

In Example 12, the subject matter of Examples 1-11 includes, the subject matter wherein the trusted hardware component and the device are configured according to specification of a Trusted Computing Group (TCG) standards family.

Example 13 is a method for onboarding a subject device for use with a security profile, using operations performed by an onboarding tool device comprising: receiving a request to perform an owner transfer method of the subject device, the subject device being associated with a device platform; verifying attestation evidence associated with the subject device, the attestation evidence provided by the device platform, wherein the attestation evidence is signed by a certificate produced using a manufacturer-embedded key, and wherein the manufacturer-embedded key is provided from a trusted hardware component of the device platform; and performing device provisioning of the subject device, based on the attestation evidence, wherein the device provisioning causes the subject device to use a security profile tied to manufacturer-embedded keys.

In Example 14, the subject matter of Example 13 includes, maintaining a list of owned and trusted devices of the device platform, the list including the subject device.

In Example 15, the subject matter of Examples 13-14 includes, the subject matter wherein performing device provisioning includes further operations comprising: provisioning the subject device with local credentials from a local certificate authority, the local certificate authority operated by the device, wherein the local credentials indicate a verified use of the security profile tied to manufacturer-embedded keys.

In Example 16, the subject matter of Examples 13-15 includes, the subject matter wherein performing device provisioning includes further operations comprising: updating a resource of the subject device to a value associated with the security profile, wherein the subject device is transitioned to use of the security profile upon completion of the device provisioning.

In Example 17, the subject matter of Examples 13-16 includes, the subject matter wherein the manufacturer-embedded key is associated with a trust anchor, wherein the trust anchor is managed through use of a trust anchor management protocol.

In Example 18, the subject matter of Examples 13-17 includes, the subject matter wherein the manufacturer-embedded key is linked to a certificate chain, wherein the certificate chain is terminated by a trust anchor, and wherein the attestation evidence includes the trust anchor.

In Example 19, the subject matter of Examples 13-18 includes, the subject matter wherein the manufacturer-embedded key is associated with a platform attribute credential of the device platform, and wherein the platform attribute credential includes platform information that is publicly verifiable at a third party data source.

In Example 20, the subject matter of Examples 13-19 includes: querying a blockchain to confirm a trust anchor linked to the manufacturer-embedded key.

In Example 21, the subject matter of Example 20 includes: querying the blockchain to search for a trust anchor revocation for the trust anchor linked to the manufacturer-embedded key; and causing the subject device to use another security profile for the subject device based on identifying the trust anchor revocation.

In Example 22, the subject matter of Examples 15-21 includes, the subject matter wherein the subject device conducts a trusted boot sequence of device software for operation on the subject device, and wherein the attestation evidence includes verification of the trusted boot sequence by the device platform.

In Example 23, the subject matter of Examples 15-22 includes, the subject matter wherein the onboarding tool device and the device platform operate according to a specification of an Open Connectivity Foundation (OCF) standards family.

In Example 24, the subject matter of Example 23 includes, the subject matter wherein the trusted hardware component and the device platform are configured according to specification of a Trusted Computing Group (TCG) standards family.

Example 25 is a machine-readable storage medium including instructions, wherein the instructions, when executed by a processing circuitry of a computing device, cause the processing circuitry to perform operations of any of Examples 13 to 24.

Example 26 is an apparatus, comprising: means for receiving a request to perform an owner transfer method of a subject device, the subject device being associated with a device platform; means for verifying attestation evidence associated with the subject device, the attestation evidence provided by the device platform, wherein the attestation evidence is signed by a certificate produced using a manufacturer-embedded key, and wherein the manufacturer-embedded key is provided from a trusted hardware component of the device platform; and means for performing device provisioning of the subject device, based on the attestation evidence, wherein the device provisioning causes the subject device to use a security profile tied to manufacturer-embedded keys.

In Example 27, the subject matter of Example 26 includes, means for maintaining a list of owned and trusted devices of the device platform, the list including the subject device.

In Example 28, the subject matter of Examples 26-27 includes, means for provisioning the subject device with local credentials from a local certificate authority, the local certificate authority operated by the device, wherein the local credentials indicate a verified use of the security profile tied to manufacturer-embedded keys.

In Example 29, the subject matter of Examples 26-28 includes, means for updating a resource of the subject device to a value associated with the security profile, wherein the subject device is transitioned to use of the security profile upon completion of the device provisioning.

In Example 30, the subject matter of Examples 26-29 includes, the subject matter wherein the manufacturer-embedded key is associated with a trust anchor, wherein the trust anchor is managed through use of a trust anchor management protocol.

In Example 31, the subject matter of Examples 26-30 includes, the subject matter wherein the manufacturer-embedded key is linked to a certificate chain, wherein the certificate chain is terminated by a trust anchor, and wherein the attestation evidence includes the trust anchor.

In Example 32, the subject matter of Examples 26-31 includes, the subject matter wherein the manufacturer-embedded key is associated with a platform attribute credential of the device platform, and wherein the platform attribute credential includes platform information that is publicly verifiable at a third party data source.

In Example 33, the subject matter of Examples 26-32 includes, means for querying a blockchain to confirm a trust anchor linked to the manufacturer-embedded key.

In Example 34, the subject matter of Example 33 includes, means for querying the blockchain to search for a trust anchor revocation for the trust anchor linked to the manufacturer-embedded key; and means for causing the subject device to use another security profile for the subject device based on identifying the trust anchor revocation.

In Example 35, the subject matter of Examples 26-34 includes, the subject matter wherein the subject device conducts a trusted boot sequence of device software for operation on the subject device, and wherein the attestation evidence includes verification of the trusted boot sequence by the device platform.

In Example 36, the subject matter of Examples 26-35 includes, the subject matter wherein the apparatus and the device platform operate according to a specification of an Open Connectivity Foundation (OCF) standards family.

In Example 37, the subject matter of Examples 26-36 includes, the subject matter wherein the trusted hardware component and the device platform are configured according to specification of a Trusted Computing Group (TCG) standards family.

Example 38 is an IoT services platform adapted to perform the operations of any of Examples 1 to 37.

Example 39 is an Open Connectivity Foundation (OCF) device, configured as a server, client, or intermediary according to an OCF specification, comprising means to implement the operations of any of Examples 1 to 37.

Example 40 is a device owner transfer service management service adapted to perform the operations invoked by any of Examples 1 to 37.

Example 41 is an Internet of Things (IoT) network topology, the IoT network topology comprising respective communication links adapted to perform communications for the operations of any of Examples 1 to 37.

Example 42 is a network comprising respective devices and device communication mediums for performing any of the operations of Examples 1 to 37.

Example 43 is an apparatus comprising means for performing any of the operations of Examples 1 to 37.

Example 44 is a system to perform the operations of any of Examples 1 to 37.

The operations and functionality described above in these examples, and in the specific embodiments described with reference to FIGS. 3 to 9, may apply in a variety of network settings such as IoT networking, edge networking, fog networking, cloud networking, and all hybrids thereof. The operations and functionality of these examples and configurations may occur in a distributed fashion, including in distributed networked settings where one aspect of the functionality is performed by a first IoT edge device or edge network, another aspect of the functionality is performed by a fog network or platform, and yet another aspect of the functionality is performed by a cloud device or system. Further combinations which follow these shared, distributed, or grouping principles, as suggested in the examples and configurations above, can be employed. Accordingly, it will be evident that the functionality described herein may be operable to work within many permutations of the examples and configurations above, and like variations.

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. An onboarding computing device, comprising:
communications circuitry;
processing circuitry; and
a memory device including instructions embodied thereon, wherein the instructions, which when executed by the processing circuitry, configure the processing circuitry to perform operations comprising:
receiving a request to perform an owner transfer method of a subject device, the subject device being associated with a trusted platform configured to host a plurality of networked devices, wherein the subject device, the onboarding computing device, and the trusted platform are provided by separate entities;
verifying attestation evidence associated with the subject device, the attestation evidence generated at the trusted platform and provided by the trusted platform, wherein the attestation evidence is signed by a certificate produced using a manufacturer-embedded key of a trusted hardware component of the trusted platform, and wherein the certificate attests conformance of the trusted platform to security requirements as evaluated by a third party; and
performing device provisioning operations to provision credentials into the subject device and onboard the subject device to become trusted by the trusted platform, based on the attestation evidence that includes the certificate, wherein the device provisioning operations cause the subject device to use a security profile tied to manufacturer-embedded keys of the subject device.

2. The onboarding computing device of claim 1, the operations further comprising:
maintaining a list of owned and trusted devices of the trusted platform, the list including the subject device.

3. The onboarding computing device of claim 1, wherein performing the device provisioning operations includes further operations comprising:
provisioning the subject device with local credentials from a local certificate authority, the local certificate authority operated by the onboarding computing device, wherein the local credentials indicate a verified use of the security profile tied to manufacturer-embedded keys.

4. The onboarding computing device of claim 1, wherein performing device provisioning includes further operations comprising:
updating a resource of the subject device to a value associated with the security profile, wherein the subject device is transitioned to use of the security profile upon completion of the device provisioning.

5. The onboarding computing device of claim 1, wherein the manufacturer-embedded key is associated with a trust anchor, wherein the trust anchor is managed through use of a trust anchor management protocol.

6. The onboarding computing device of claim 1, wherein the manufacturer-embedded key is linked to a certificate chain, wherein the certificate chain is terminated by a trust anchor, and wherein the attestation evidence includes the trust anchor.

7. The onboarding computing device of claim 1, wherein the manufacturer-embedded key is associated with a platform attribute credential of the trusted platform, and wherein the platform attribute credential includes platform information that is publicly verifiable at a third party data source.

8. The onboarding computing device of claim 1, the operations further comprising:
querying a blockchain to confirm a trust anchor linked to the manufacturer-embedded key.

9. The onboarding computing device of claim 8, the operations further comprising:
querying the blockchain to search for a trust anchor revocation for the trust anchor linked to the manufacturer-embedded key; and
causing the subject device to use another security profile based on identifying the trust anchor revocation.

10. The onboarding computing device of claim 1, wherein the subject device conducts a trusted boot sequence of device software for operation on the subject device, and wherein the attestation evidence attests to verification of the trusted boot sequence by the trusted platform.

11. The onboarding computing device of claim 1, wherein the onboarding computing device operates as an onboarding tool, and wherein the onboarding computing device and the trusted platform are configured according to a specification of an Open Connectivity Foundation (OCF) standards family.

12. The onboarding computing device of claim 1, wherein the trusted hardware component and the onboarding computing device are configured according to a specification of a Trusted Computing Group (TCG) standards family.

13. A method for onboarding a subject device for use with a security profile, using operations performed by an onboarding computing device comprising:
receiving a request to perform an owner transfer method of the subject device, the subject device being associated with a trusted platform configured to host a plurality of networked devices, wherein the subject device, the onboarding computing device, and the trusted platform are provided by separate entities;

verifying attestation evidence associated with the subject device, the attestation evidence generated at the trusted platform and provided by the trusted platform, wherein the attestation evidence is signed by a certificate produced using a manufacturer-embedded key of a trusted hardware component of the trusted device platform, and wherein the certificate attests conformance of the trusted platform to security requirements as evaluated by a third party; and performing device provisioning operations to provision credentials into the subject device and onboard the subject device to become trusted by the trusted platform, based on the attestation evidence that includes the certificate, wherein the device provisioning operations cause the subject device to use a security profile tied to manufacturer-embedded keys of the subject device.

14. The method of claim 13, further comprising:
maintaining a list of owned and trusted devices of the trusted platform, the list including the subject device.

15. The method of claim 13, wherein performing device provisioning includes further operations comprising:
provisioning the subject device with local credentials from a local certificate authority, the local certificate authority operated by the onboarding computing device, wherein the local credentials indicate a verified use of the security profile tied to manufacturer-embedded keys.

16. The method of claim 13, wherein performing device provisioning includes further operations comprising:
updating a resource of the subject device to a value associated with the security profile, wherein the subject device is transitioned to use of the security profile upon completion of the device provisioning.

17. The method of claim 13, wherein the manufacturer-embedded key is associated with a trust anchor, wherein the trust anchor is managed through use of a trust anchor management protocol.

18. The method of claim 13, wherein the manufacturer-embedded key is linked to a certificate chain, wherein the certificate chain is terminated by a trust anchor, and wherein the attestation evidence includes the trust anchor.

19. The method of claim 13, wherein the manufacturer-embedded key is associated with a platform attribute credential of the trusted platform, and wherein the platform attribute credential includes platform information that is publicly verifiable at a third party data source.

20. The method of claim 13, the operations further comprising:
querying a blockchain to confirm a trust anchor linked to the manufacturer-embedded key.

21. The method of claim 20, the operations further comprising:
querying the blockchain to search for a trust anchor revocation for the trust anchor linked to the manufacturer-embedded key; and
causing the subject device to use another security profile based on identifying the trust anchor revocation.

22. The method of claim 13, wherein the subject device conducts a trusted boot sequence of device software for operation on the subject device, and wherein the attestation evidence attests to verification of the trusted boot sequence by the trusted platform.

23. The method of claim 13, wherein the onboarding computing device and the trusted platform operate according to a specification of an Open Connectivity Foundation (OCF) standards family, and wherein the trusted hardware component and the trusted platform are further configured according to a specification of a Trusted Computing Group (TCG) standards family.

24. A non-transitory machine-readable storage medium including instructions, wherein the instructions, when executed by a processing circuitry of an onboarding computing device, cause the processing circuitry to perform operations comprising:
receiving a request to perform an owner transfer method of a subject device, the subject device being associated with a trusted platform configured to host a plurality of networked devices, wherein the subject device, the onboarding computing device, and the trusted platform are provided by separate entities;
verifying attestation evidence associated with the subject device, the attestation evidence generated at the trusted platform and provided by the trusted platform, wherein the attestation evidence is signed by a certificate produced using a manufacturer-embedded key of a trusted hardware component of the trusted platform, and wherein the certificate attests conformance of the trusted platform to security requirements as evaluated by a third party; and
performing device provisioning operations to provision credentials into the subject device and onboard the subject device to become trusted by the trusted platform, based on the attestation evidence that includes the certificate, wherein the device provisioning operations cause the subject device to use a security profile tied to manufacturer-embedded keys of the subject device.

25. The non-transitory machine-readable storage medium of claim 24, wherein the subject device conducts a trusted boot sequence of device software for operation on the subject device, and wherein the attestation evidence includes attests to verification of the trusted boot sequence by the trusted platform.

* * * * *

UNITED STATES PATENT AND TRADEMARK OFFICE
CERTIFICATE OF CORRECTION

| | | |
|---|---|---|
| PATENT NO. | : 12,028,443 B2 | Page 1 of 1 |
| APPLICATION NO. | : 16/650439 | |
| DATED | : July 2, 2024 | |
| INVENTOR(S) | : Cabre et al. | |

It is certified that error appears in the above-identified patent and that said Letters Patent is hereby corrected as shown below:

In the Claims

In Column 30, Line 50, in Claim 25, after "evidence", delete "includes"

Signed and Sealed this
Seventh Day of October, 2025

John A. Squires
*Director of the United States Patent and Trademark Office*